United States Patent
Shon et al.

(10) Patent No.: US 9,557,808 B2
(45) Date of Patent: Jan. 31, 2017

(54) DISPLAY APPARATUS AND METHOD FOR MOTION RECOGNITION THEREOF

(71) Applicant: SAMSUNG ELECTRONICS CO., LTD., Suwon-si (KR)

(72) Inventors: Chang-ho Shon, Seoul (KR); Jae-hyun Bae, Seoul (KR); Yun-ho Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 249 days.

(21) Appl. No.: 14/269,291

(22) Filed: May 5, 2014

(65) Prior Publication Data

US 2015/0084852 A1 Mar. 26, 2015

(30) Foreign Application Priority Data

Sep. 23, 2013 (KR) ........................ 10-2013-0112831

(51) Int. Cl.
*G06F 3/00* (2006.01)
*G06F 3/01* (2006.01)
(Continued)

(52) U.S. Cl.
CPC ............... *G06F 3/005* (2013.01); *G06F 3/017* (2013.01); *G06F 3/0487* (2013.01);
(Continued)

(58) Field of Classification Search
CPC ........ G06F 3/005; G06F 3/017; H04N 5/4403; H04N 21/485; H04N 21/4223; H04N 21/44008
See application file for complete search history.

(56) References Cited

U.S. PATENT DOCUMENTS 7,173,666 B1 * 2/2007 Masaki .............. H04N 5/23293
348/445
8,160,652 B2 * 4/2012 Nam ..................... G06F 1/1624
455/566
(Continued)

FOREIGN PATENT DOCUMENTS

EP 2 421 252 A1 2/2012
JP 2010-081466 A 4/2010
(Continued)

OTHER PUBLICATIONS

Search report dated Nov. 14, 2014 issued by the Int. Searching Authority in counterpart Int. Application No. PCT/KR2014/007032 (PCT/ISA/210).
(Continued)

*Primary Examiner* — Abbas Abdulselam
(74) *Attorney, Agent, or Firm* — Sughrue Mion, PLLC

(57) ABSTRACT

A display apparatus and a method for recognizing a motion thereof are provided. The method includes setting an active area in which the externally input motion is recognizable, wherein the active area corresponds to a portion on a screen of the display apparatus, changing the display apparatus from an overall area motion recognition mode to a partial area motion recognition mode configured to only recognize the externally input motion in the active area, recognizing the externally input motion in the active area, and disabling the partial area motion recognition mode in response to the recognized externally input motion being a disabling motion configured to disable the partial area motion recognition mode.

31 Claims, 21 Drawing Sheets

(51) Int. Cl.
*H04N 5/44* (2011.01)
*H04N 21/4223* (2011.01)
*H04N 21/44* (2011.01)
*H04N 21/485* (2011.01)
*G06F 3/0487* (2013.01)
*G06K 9/00* (2006.01)

(52) U.S. Cl.
CPC ....... *G06K 9/00355* (2013.01); *H04N 5/4403* (2013.01); *H04N 21/4223* (2013.01); *H04N 21/44008* (2013.01); *H04N 21/485* (2013.01)

(56) References Cited

U.S. PATENT DOCUMENTS

| | | | |
|---|---|---|---|
| 8,270,669 B2 * | 9/2012 | Aichi | G06F 3/0425 382/103 |
| 8,766,926 B2 * | 7/2014 | Wirtanen | G06F 3/0346 178/18.01 |
| 2009/0153655 A1 | 6/2009 | Ike et al. | |
| 2012/0069168 A1 | 3/2012 | Huang et al. | |
| 2013/0107026 A1 | 5/2013 | Kim | |
| 2013/0182898 A1 | 7/2013 | Maeda et al. | |
| 2013/0212483 A1 | 8/2013 | Brakensiek et al. | |
| 2014/0184512 A1 * | 7/2014 | Okuley | G06F 3/1454 345/168 |

FOREIGN PATENT DOCUMENTS

| | | |
|---|---|---|
| JP | 2012-191568 A | 10/2012 |
| KR | 10-2013-0005548 A | 1/2013 |
| WO | 2013063767 A1 | 5/2013 |

OTHER PUBLICATIONS

Written Opinion dated Nov. 14, 2014 issued by the Int. Searching Authority in counterpart Int. Application No. PCT/KR2014/007032 (PCT/ISA/237).
Communication dated Dec. 4, 2015, issued by the Korean Intellectual Property Office in counterpart Korean Application No. 10-2013-0112831.
Search report dated Aug. 12, 2016 issued by the European Patent Office in counterpart European Application No. 14846695.6.
Communication dated Sep. 8, 2016 issued by the European Patent Office in counterpart European Application No. 14846695.6.

* cited by examiner

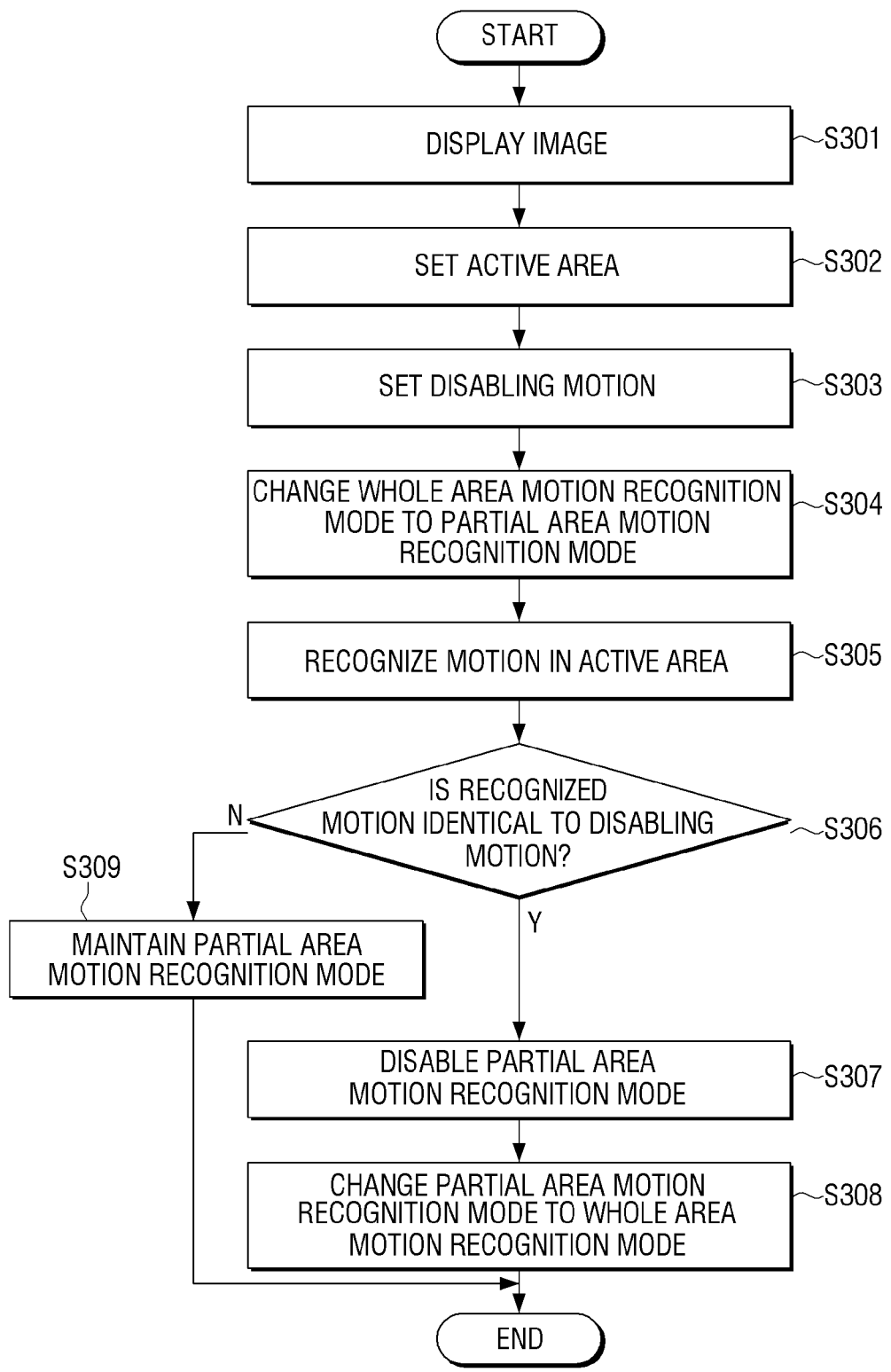

443

DISPLAY APPARATUS AND METHOD FOR MOTION RECOGNITION THEREOF

CROSS-REFERENCE TO RELATED APPLICATION

This application claims priority from Korean Patent Application No. 10-2013-0112831 filed on Sep. 23, 2013 in the Korean Intellectual Property Office, the disclosure of which is hereby incorporated by reference in its entirety.

BACKGROUND

1. Technical Field

Apparatuses and methods consistent with exemplary embodiments relate to a display apparatus and a method for recognizing a motion thereof, and more particularly, to a display apparatus which can recognize a motion only in an active area in a partial area motion recognition mode, and a method for recognizing a motion thereof.

2. Description of the Related Art

A panel key on the display apparatus or a remote controller is frequently used as interface methods between a display apparatus and a user. Advancements and development in display technologies has provided display apparatuses that may be equipped with various and complex functions such as, for example, the ability to execute content or browse the Internet. Controlling these functions may be equally variant and complex and may therefore be not easily done using a remote control or panel keys to control all functions of the display apparatus. Thus, the functionality and control that may be offered may become complex and are diversifying due to the size or function limit of the remote controller and panel keys.

Further, another method on controlling a display apparatus may include the user making a motion toward the display apparatus which receives the motion and may be controlled by motion recognition. Also, the user may utter a command and the display apparatus, which receives the command, may be controlled by voice recognition.

However, the display apparatus which is capable of motion recognition may recognize a motion that is input through a camera regardless of a user's intention (for example, when the user moves the user's hand to drink water), and may cause a false operation. Also, when a plurality of users use the display apparatus, the false operation is more likely to occur than when a single user uses the display apparatus.

SUMMARY

According to an aspect of an exemplary embodiment, there is provided a method for recognizing an externally input motion with a display apparatus, the method including setting an active area in which the externally input motion is recognizable, wherein the active area corresponds to a portion on a screen of the display apparatus, changing the display apparatus from an overall area motion recognition mode to a partial area motion recognition mode configured to only recognize the externally input motion in the active area, recognizing the externally input motion in the active area, and disabling the partial area motion recognition mode in response to the recognized externally input motion being a disabling motion configured to disable the partial area motion recognition mode.

The active area may be set by at least one of a remote controller, voice recognition, motion recognition, and a panel key.

One of a location, a size, and a shape of the active area may be set through an active area setting template displayed on the screen.

The active area may be automatically set to be larger than an area of a part of a user's body input through a camera.

The method may further include storing user body information corresponding to the part of the user's body to automatically set the active area.

The active area may be smaller than an area of the screen.

The method may further include automatically displaying an active area setting screen to set the active area in response to initial power being supplied to the display apparatus.

The method may further include setting the disabling motion, wherein the disabling motion is set in at least one of the active area using a camera, and in a recognition range of the camera.

The active area may be larger than a recognition area of the recognized disabling motion.

The changing the overall area motion recognition mode to the partial area motion recognition mode may include displaying an object corresponding to the partial area motion recognition mode on one side of the screen in response to the change from the overall area motion recognition mode to the partial area motion recognition mode.

The changing the overall area motion recognition mode to the partial area motion recognition mode may include displaying the active area having transparency distinguishably from content on the screen in response to the change from the overall area motion recognition mode to the partial area motion recognition mode.

The changing the overall area motion recognition mode to the partial area motion recognition mode may include providing at least one of visual feedback and audio feedback in response to the change from the overall area motion recognition mode to the partial area motion recognition mode.

The active area may be a relative area in the screen configured to recognize the disabling motion which is received through a camera.

The method may further include maintaining the partial area motion recognition mode in response to the recognized externally input motion being different from the disabling motion.

The maintaining the partial area motion recognition mode may include displaying a pop-up window corresponding to the maintained partial area motion recognition mode on the screen in response to the recognized externally input motion being different from the disabling motion.

According to an aspect of another exemplary embodiment, there is provided a method for recognizing an external motion with a display apparatus, the method including changing the display apparatus from an overall area motion recognition mode to a partial area motion recognition mode, recognizing the external motion that is input only in an active area set in the partial area motion recognition mode, and changing the partial area motion recognition mode to the overall area motion recognition mode in response to the recognized external motion matching a stored disabling motion to disable the partial area motion recognition mode, wherein the active area is a relative area in a screen of the display apparatus configured to recognize the external motion that is externally input to the display apparatus through a camera.

According to an aspect of another exemplary embodiment, there is provided a method for recognizing an externally input motion with a display apparatus, the method including setting an active area in which the externally input motion is recognizable, wherein the active area corresponds to a portion on a screen of the display apparatus, changing the display apparatus from an overall area motion recognition mode to a partial area motion recognition mode, wherein the partial area motion recognition mode includes a first partial area motion recognition mode in which the partial area motion recognition mode is disabled in response to a first motion being a first disabling motion, and a second partial area motion recognition mode in which the partial area motion recognition mode is maintained in response to the first motion being a second disabling motion, recognizing the first motion in the active area, entering a second partial area motion recognition mode in which the partial area motion recognition mode is maintained in response to the first motion being the second disabling motion, and recognizing a second motion in the active area which is in the second partial area motion recognition mode.

According to an aspect of another exemplary embodiment, there is provided a method for recognizing a motion with a display apparatus, the method including changing the display apparatus from an overall area motion recognition mode to a partial area motion recognition mode, and recognizing the motion that is externally input only in an active area in the partial area motion recognition mode.

The active area may be set by a user.

According to an aspect of another exemplary embodiment, there is provided a display apparatus including a display configured to display multimedia content, a camera configured to receive an external motion, and a controller configured to control the display and the camera, wherein the controller is further configured to change a partial area motion recognition mode to an overall area motion recognition mode in response to the external motion being input in an active area through the camera matches a disabling motion configured to disable the partial area motion recognition mode.

The display apparatus may further include a panel key, a microphone configured to receive a sound, and a signal receiver configured to receive a signal from a remote controller, wherein the controller changes the overall area motion recognition mode to the partial area motion recognition mode based on a user manipulation which is input through one of the camera, the panel key, the microphone, and the signal receiver.

The active area may be a relative area that is displayed on the screen in response to recognition of a disabling motion input through the camera.

According to an aspect of another exemplary embodiment, there is provided a display apparatus including a display configured to display multimedia content, a camera configured to receive an external motion, and a controller configured to control the display and the camera, wherein the controller is further configured to recognize a user motion that is received only in an active area using the camera when the display apparatus is in a partial area motion recognition mode, and display a user motion recognition result corresponding to the recognized user motion on the display.

BRIEF DESCRIPTION OF THE DRAWINGS

These and/or other aspects will become more apparent and more readily appreciated from the following description describing in detail exemplary embodiments, taken in conjunction with the accompanying drawings, in which:

FIG. 3 is a flowchart illustrating a method for recognizing a motion of a display apparatus according to an exemplary embodiment.

DETAILED DESCRIPTION

Figure 1:
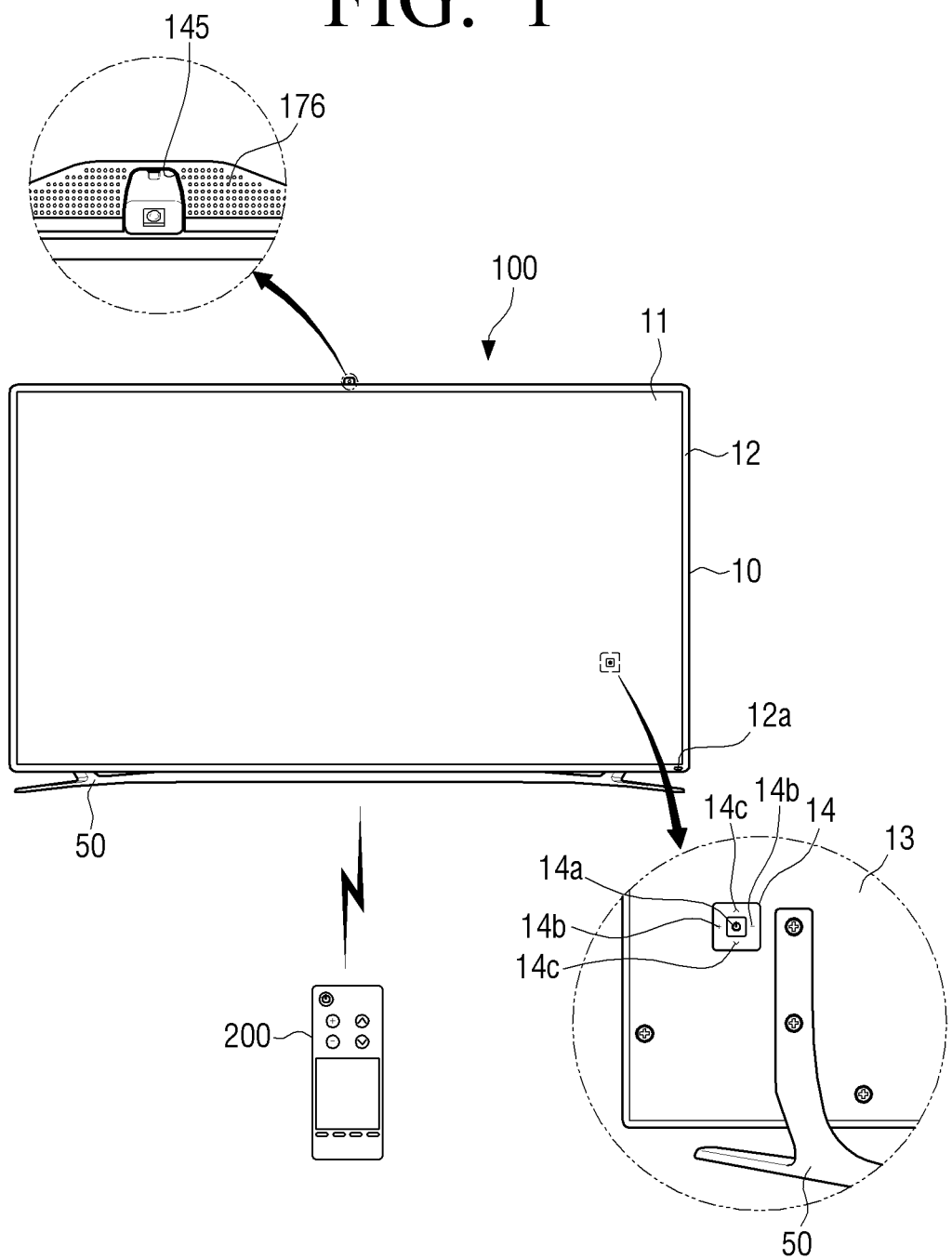
FIG. 1 is a schematic front view illustrating a display apparatus according to an exemplary embodiment.

Hereinafter, exemplary embodiments will be described in greater detail with reference to the accompanying drawings. Also, methods for manufacturing and using the present disclosure will be explained in detail with reference to the accompanying drawings. In the following description, same reference numerals are used for the same elements when they are depicted in different drawings.

If the terms such as 'first' and 'second' are used to describe elements, these element should not be limited by such terms. These terms are used for the purpose of distinguishing one element from another element only. For example, the first element may be referred to as the second element and similarly the second element may be referred as the first element without departing from the scope of the present disclosure. The term "and/or" includes a combination of a plurality of relevant items or one of the plurality of relevant items.

The terms used herein are for the purpose of describing particular exemplary embodiments only and are not intended to be limiting. As used herein, the singular forms "a", "an" and "the" are intended to include the plural forms as well, unless the context clearly indicates otherwise. It will be further understood that the terms "comprises" and/or "comprising," are to indicate existence of a feature, a number, a step, an operation, an element, a part or a combination thereof described in the specification, and do not preclude the presence or addition of one or more other features, numbers, steps, operations, elements, parts or combinations thereof.

FIG. 1 is a schematic front view illustrating a display apparatus according to an exemplary embodiment.

Referring to FIG. 1, a display apparatus 100 configured to display multimedia content, such as videos, pictures, music, etc., may include a body 10 and a stand 50 to support the body 10. In addition, the display apparatus 100 may include only the body 10 without the stand 50.

The body 10 includes a display 170 (see FIG. 2) which includes a display panel 11 to display a still image or a video which is a set of continuous images (see FIG. 2), and a front cover 12 and a back cover 13 to support the display panel 11. The display panel 11 is referred to as a screen.

The front cover 12 may include a light window 12a to receive light (for example, ultraviolet rays, visible ray, or infrared rays) from an external source (for example, a remote controller 200). The light window 12a outputs light that is generated by an internal source of the display apparatus 100 (for example, light emitting from a light emitting element) to the outside of the display apparatus 100. The back cover 13 may be connected with the stand 50. The back cover 13 may include a panel key 14 including a power key 14a, a volume key 14b, and a channel key 14c provided on one side of the back cover 14. According to another exemplary embodiment, the panel key 14 may include a TV/external input key or a menu key.

The display apparatus 100 may analyze the light received through the light window 12a and may control an operation of the display apparatus 100 based on the received light.

The display apparatus 100 may analyze a video signal that is received through a camera 145 (for example, continuous frames), and may control the operation of the display apparatus 100 based on the received and analyzed video signal.

The display apparatus 100 may analyze a user's voice that is received through a microphone 140 (see FIG. 2) disposed behind a speaker 176, and may control the operation of the display apparatus 100.

For example, the display apparatus 100 may be controlled according to the received light, video signal, voice, or combination thereof and may perform various operations such as controlling power (on/off), adjusting volume, changing channel, mute, controlling external input, web surfing using a communicator, inputting characters, and executing a stored content using an application.

Referring to FIG. 1, a single camera 145 may selectively protrude from a center area on an upper end of the front cover 12. However, this should not be considered as limiting as a plurality of cameras may be exposed from the center area on the upper end and may receive a plurality of video signals.

The camera 145 may be provided in at least one of an upper end, a lower end, a left end, and a right end with reference to a front surface of the front cover 12 and configured to receive the video signal.

A single microphone 140 is exposed from the center area on the upper end of the front cover 12. However, this should not be considered as limiting and a plurality of microphones may be provided in the center area of the upper end to receive the voice as stereo. The microphone 140 may be provided on at least one of the upper end, lower end, left end and right end with reference to the front surface of the front cover 12.

The single light window 12a may be located at the right lower end of the front cover 12. However, this should not be considered as limiting and a plurality of light windows may be exposed. The light window 12a located at the front cover 12 may instead be found at the upper end, lower end, left end, and right end with reference to the front surface of the front cover 12 according to the input/output of light. Also, when a remote controller 200 and the display apparatus 100 are connected with each other by wireless communication such as Bluetooth using the communicator 130 (see FIG. 2), the light window 12a may be omitted from the display apparatus 100.

The stand 50 may include a wall mount to support the body 10 against a wall surface.

Figure 2:
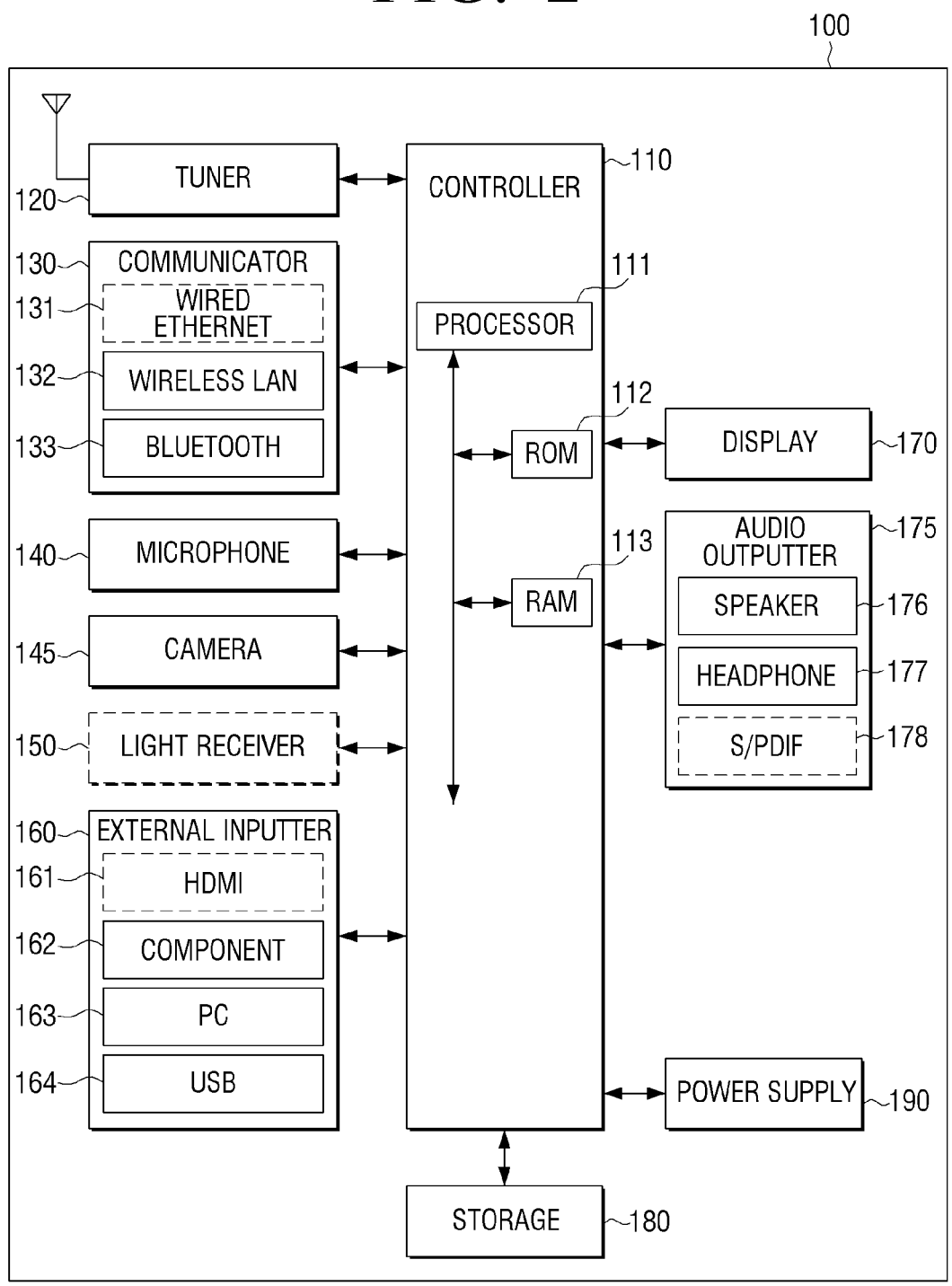
FIG. 2 is a block diagram illustrating a display apparatus according to an exemplary embodiment.

FIG. 2 is a schematic block diagram illustrating a display apparatus according to an exemplary embodiment.

Referring to FIG. 2, a display apparatus 100 may be connected with an external apparatus in a wired or wireless manner using a communicator 130 or an external inputter 160. The external apparatus may include a mobile phone, a smartphone, a tablet PC, and a server.

The display apparatus 100 may include one of a tuner 120, the communicator 130, and the external inputter 160 in addition to the display 170.

The display apparatus 100 may include a combination of the tuner 120, the communicator 130, and the external inputter 160 in addition to the display 170. Also, the display apparatus 100 including the display 170 may be electrically connected with an external apparatus having a tuner. For example, the display apparatus 100 may be implemented by using an analogue TV, a digital TV, a 3D TV, a smart TV, a light emitting diode (LED) TV, an organic LED (OLED) TV, a plasma TV, a monitor, etc. However, it should be easily understood by an ordinary skilled person in the related art that this should not be considered as limiting.

The display apparatus 100 may include a tuner 120, a communicator 130, a microphone 140, a camera 145, a light receiver 150, an external inputter 160, a display 170, an audio outputter 175, a storage 180, and a power supply 190. The display apparatus 100 may include a sensor to detect an inner state or an outer state of the display apparatus 100 (for example, an illuminance sensor, a temperature sensor, etc.).

A controller may include a processor 111, a read only memory (ROM) 112 which stores a control program to control the display apparatus 100, and a random access memory (RAM) 113 which stores signals or data input from the outside of the display apparatus 100 or is used as storage areas corresponding to various operations performed in the display apparatus 100. According to another exemplary embodiment, the controller may include a plurality of processors as well as memory units. Further the controller may further include one or more graphics processing units (GPUs) and one or more digital signal processors (DSPs).

The controller may be configured to control an overall operation of the display apparatus 100 and signal flow among the inner elements 120 through 190 of the display apparatus 100, and perform a data processing function. The controller may further control power to be supplied from the power supply 190 to the inner elements 120 through 180. In accordance with a user's input or a predetermined and stored condition being satisfied, the controller may execute an operating system (OS) and various applications stored in the storage.

The processor 111 may include a graphic processing unit (GPU) to process graphics corresponding to an image or a video. The processor 111 may include a core and a GPU which are implemented by using a system on chip (SoC). The processor 111 may include a single core, a dual core, a triple core, a quad core, and a multi- core.

The processor 111 may include a plurality of processors, for example, a main processor (not shown) and a sub processor (not shown) which operates in a sleep mode. Also, the processor 111, the ROM 112, and the RAM 113 may be connected with one another through an internal bus.

The term "controller" used herein includes the processor 111, the ROM 112, and the RAM 113.

According to an exemplary embodiment, the controller may set an active area in which a motion is recognizable on the screen of the display apparatus, change an overall area motion recognition mode of the display apparatus to a partial area motion recognition mode, and, when a motion is recognized in the active area and the recognized motion is a disabling motion to disable the partial area motion recognition mode, control to disable the partial area motion recognition mode.

The overall area motion recognition mode refers to a mode in which the display apparatus 100 is controlled by a motion that is recognized using the camera 145 from the whole recognition range of the camera 145. The partial area motion recognition mode refers to a mode in which the display apparatus 100 is controlled only by a motion that is recognized in an active area within the recognition range of the camera 145. The active area refers to an area that is set for recognizing a motion. The active area may be defined as a local area that is used to recognize a user's motion in a photographed image in the partial area motion recognition mode. The active area may be set by user input or may be preset by a manufacturer.

In the partial area motion recognition mode, the controller may control to recognize a motion only in the active area.

The controller may set the active area in various ways. For example, the controller may control to set the active area using one of a remote controller, voice recognition, motion recognition, a panel key, or a combination thereof.

The controller may control to set the active area by changing at least one of a location, a size, and a shape of the active area using an active area setting template.

In addition, the controller may set an active area having an area corresponding to a user motion input through the camera, besides the active area setting template. According to another exemplary embodiment, the controller may control to set the active area by tracking an area drawn by a user using the camera. For example, a user may extend an index finger and outline a shape such as an oval, triangle, or any other shape defined by a continuous outer edge that encircles and internal sub area of the overall screen that can be defined as the active area and the portions remaining that falls outside the edge can be a masked area where inputs are ignored.

The controller may store the user motion which is input through the camera to set the active area in the storage in advance.

The controller may control to set the area of the active area to be smaller than that of the screen.

When power is initially supplied to the display apparatus 100, the controller may control to automatically display an active area setting screen to set the active area. Alternatively, the display apparatus 100 may contain a preset setting stored in the ROM 112 that sets the active area to a certain initial setting.

The controller may set a disabling motion that is input using the camera through at least one of the recognition range of the camera and the active area.

The controller may control to set the area of the active area to be larger than a range of the recognized disabling motion.

The controller may control to change the overall area motion recognition mode to the partial area motion recognition mode using one of the remote controller, the voice recognition, the motion recognition, the panel key, or combination thereof.

The controller may control to display an object corresponding to the partial area motion recognition mode on one side of the screen in response to the change from the overall area motion recognition mode to the partial area motion recognition mode.

The controller may control to display the active area having transparency along with a distinguishable screen in response to the change from the overall area motion recognition mode to the partial area motion recognition mode.

The controller may control to provide at least one of visual feedback and audio feedback through the screen and the audio outputter in response to the change from the overall area motion recognition mode to the partial area motion recognition mode.

The controller may control to recognize a motion within the recognition range of the camera in the overall area motion recognition mode.

When a recognized motion is different from the disabling motion, the controller may control to maintain the partial area motion recognition mode.

When the recognized motion is different from the disabling motion, the controller may control to display a pop-up window corresponding to the maintenance of the partial area motion recognition mode.

The controller may control to change the overall area motion recognition mode of the display apparatus to the partial area motion recognition mode, recognize a motion only in the predetermined active area in the partial area motion recognition mode, and, when the recognized motion is identical to the disabling motion which is stored to disable the partial area motion recognition mode, change the partial area motion recognition mode to the overall area motion recognition mode.

The controller may selectively operate in one of the overall area motion recognition mode and the partial area motion recognition mode according to user input. For example, the controller may control the display apparatus 100 using various user motions which are input in the overall area motion recognition mode. When the overall area motion recognition mode is changed to the partial area motion recognition mode, the controller may not recognize a user motion that is input to an area other than the active area, and, even if the controller recognizes the motion that is input to the area other than the active area, the controller may disregard the user motion. The controller can prevent a false operation that may be caused by a user's unintended motion in the partial area motion recognition mode.

When the user wishes to control the display apparatus 100 using motions in the partial area motion recognition mode, the user may input the disabling motion through the active area. When the partial area motion recognition mode is disabled in response to the disabling motion and is changed to the overall area motion recognition mode, the controller may control the display apparatus 100 variously according to user motions. According to an exemplary embodiment, the partial area motion recognition mode is a mode in which the controller masks an area other than a specific area (for example, the active area). However, it will be understood by an ordinary skilled person in the related art that this should not be considered as limiting.

According to another exemplary embodiment, in the partial area motion recognition mode, the controller may perform various control operations according to various user motions input to the active area. In this case, the controller does not perform any control operation in response to a user motion that is recognized in the area other than the active area and thus can prevent a false operation.

According to another exemplary embodiment, the above-described two modes of the partial area motion recognition mode may be selectively used. The partial area motion recognition mode may include a first partial area motion recognition mode in which the partial area motion recognition mode is disabled by the disabling motion recognized in the active area and a control operation is not performed in response to a motion recognized in the other area, and a second partial area motion recognition mode in which various operations are performed by various motions after a first disabling motion has been recognized in the active area, but an operation is not performed in response to a motion that is recognized in the other area.

The controller may change the overall area motion recognition mode to the first partial area motion recognition mode or the second partial area motion recognition mode directly, and may change the first partial area motion recognition mode to the second partial area motion recognition mode or vice versa. When the disabling motion is input in the active area in the first partial area motion recognition mode, the controller may change the partial area motion recognition mode to the overall area motion recognition mode. Also, when predetermined another motion (for example, a first disabling motion) is input in the active area, the controller may change the first partial area motion recognition mode to the second partial area motion recognition mode.

According to another exemplary embodiment, the controller may set an active area in which a motion is recognizable, may change the overall area motion recognition mode of the display apparatus to the partial area motion recognition mode, when a motion recognized in the active area is the disabling motion, may change the partial area motion recognition mode to the second partial area motion recognition mode in which the partial area motion recognition mode is maintained, and may control to recognize a motion in the active area which is in the second partial area motion recognition mode. The partial area motion recognition mode may include a first partial area motion recognition mode in which, when a recognized motion is the disabling motion, the partial area motion recognition mode is disabled, and the second partial area motion recognition mode in which the partial area motion recognition mode is maintained.

It will be understood by an ordinary skilled person in the related art that configuration and operations of the controller are implemented in various ways according to an exemplary embodiment.

The tuner 120 may select a broadcast signal received in a wired or wireless manner by tuning only a frequency of a channel that the display apparatus 100 intends to receive from among many propagation components through amplification, mixing, resonance, etc. The broadcast signal includes a video, a sound, and data (for example, an electronic program guide (EPG)).

The tuner 120 may receive the video, sound, and data in a frequency band corresponding to a channel number (for example, cable channel 14) corresponding to user input (for example, input of a channel number of the remote controller 200, input of channel up-down, input of a channel on the EPG screen, input of channel up-down on the panel key 14, etc.)

The tuner 120 may receive broadcast signals from various sources such as a terrestrial broadcast, a cable broadcast, a satellite broadcast, an Internet broadcast, etc. The tuner 120 may receive broadcast signals from a source such as an analogue broadcast or a digital broadcast. The tuner 120 may be implemented in the form of all-in-one along with the display apparatus 100 or may be implemented as a separate apparatus having a tuner electrically connected with the display apparatus 100 (for example, a set-top box (not shown), a tuner connected with the external inputter 160 (see FIG. 2), etc.).

The communicator 130 may connect the display apparatus 100 with an external apparatus (for example, a server) under the control of the controller. The controller may download an application from the external apparatus connected through the communicator 130 or may browse the web. The communicator 130 may include one of a wired Ethernet 131, a wireless local area network (LAN) 132, and Bluetooth 133 according to performance and configuration of the display apparatus 100. Also, the communicator 130 may include a combination of the Ethernet 181, the wireless LAN 182, and the Bluetooth 183.

The microphone 140 receives a voice which is uttered by the user. The microphone 140 converts the received voice into an electric signal and outputs the electric signal to the controller. The user voice may include a voice corresponding to a menu or a function of the display apparatus 100, for example. A recognition range of the microphone 140 may be within 4 m from the microphone 140 to a user's location, and may vary according to a level of the user's voice and an environment (for example, a speaker sound, ambient noise, etc.).

The microphone 140 may be in an all-in-one type along with the display apparatus 100 or may be separated from the display apparatus 100. The separated microphone 140 may be electrically connected with the display apparatus 100 through the communicator 130 or the external inputter 160.

The camera 145 receives an image or a video (for example, continuous frames) corresponding to a user's motion including a gesture within a camera recognition range. For example, the recognition range of the camera 145 may be within 0.5 m to 5 m from the camera 145 to the user. The user motion may include a motion of a part of a user's body or a part of the user such as user's face, look, hand, fist, finger, etc., for example. The camera 145 converts the received video into an electric signal under the control of the controller, and outputs the electric signal to the controller 110.

The controller may analyze the received video (for example, a user motion) using a motion recognition algorithm and output a user motion recognition result on the screen of the display apparatus 100. The controller may display the user motion recognition result on a relative location of the screen corresponding to a location of the user motion. The relative location implies that the location of the user motion received by the camera 145 (for example, a 3-dimensional (3D) location or a 2D location including a distance from the camera 145 to the user motion) is different from the location of the user motion recognition result displayed on the screen (a 2D location displayed on the screen). The controller may measure the distance to the user motion received by the camera 145 using a time of flight (TOF) sensor method, a structure light sensor method, or a stereo matching sensor method.

The controller may display the user motion recognition result on the screen considering the distance to the user motion.

The controller may select a menu displayed on the display apparatus 100 using the output motion recognition result, or may perform a control operation corresponding to the motion recognition result. For example, the controller may change a channel, adjust a volume, or move an indicator.

The camera 145 may include a lens and an image sensor. The camera 145 may support optical zoom or digital zoom using a plurality of lens and image processing. For example, the camera 145 may support 5 times optical zoom or 20 times digital zoom. The recognition range of the camera 145 may be set variously according to an angle of the camera and an environment condition.

When the camera 145 includes a plurality of cameras, the camera 145 may receive a 3D still image or a 3D motion using a first camera 145 of the front cover 12 and an adjacent second camera (for example, a gap with respect to the first camera 145 is greater than 2 cm and less than 8 cm).

The camera 145 may be in an all-in-one type along with the display apparatus 100 or may be separated from the display apparatus 100. An apparatus including the separated camera 145 may be electrically connected with the display apparatus 100 through the communicator 130 or the external inputter 160.

The light receiver 150 receives light from the external remote controller 200 through the light window 12a. For example, the light receiver 150 may receive a signal of a key on the remote controller 200 (for example, an optical signal generated by pressing or touching a power key) (for example, a control signal corresponding to power on of the display apparatus 100).

The external inputter 160 may receive a video (for example, a moving image, etc.), a sound (for example, a voice, music, etc.), and data (for example, a playback command) from an external source of the display apparatus 100 under the control of the controller. The external inputter 160 may include one of a high definition multimedia interface (HDMI) input port 161, a component input jack 162, a PC input port 163, and a universal serial bus (USB) input jack 164. The external inputter 160 may include a combination of the HDMI input port 161, the component input jack 162, the PC input port 163, and the USB input jack 164.

The display 170 displays the video included in the broadcast signal received through the tuner 120 on the screen under the control of the controller. The display 170 may display the video (for example, a moving image) input through the communicator 130 or the external inputter 160. The display 170 may output the video which is stored in the storage 190 under the control of the controller. Also, the display 170 may display a voice user interface (UI) (for example, including a voice command guide) to perform a voice recognition task corresponding to voice recognition or a motion UI (for example, including a user motion guide for motion recognition) to perform a motion recognition task corresponding to motion recognition.

According to an exemplary embodiment, the display 170 may output visual feedback corresponding to the disabling of the partial area motion recognition mode under the control of the controller.

The audio outputter 175 outputs the sound included in the broadcast signal received through the tuner 120 under the control of the controller. The audio outputter 175 may output the sound (for example, a voice) input through the communicator 130 or the external inputter 160. Also, the audio outputter 175 may output the sound which is stored in the storage 190 under the control of the controller. The audio outputter 175 may include at least one of a speaker 176, a headphone output terminal 177, and an S/PDIF output terminal 178. The audio outputter 175 may include a combination of the speaker 176, the headphone output terminal 177, and the S/PDIF output terminal 178.

According to an exemplary embodiment, the audio outputter 175 may output audio feedback corresponding to the disabling of the partial area motion recognition mode under the control of the controller.

The storage 180 may store various data, programs, or applications to run and control the display apparatus 100 under the control of the controller. The storage 180 may store signals or data which are input/output in response to the running of the tuner 120, the communicator 130, the microphone 140, the camera 145, the light receiver 150, the external inputter 160, the display 170, the audio outputter 175, and the power supply 190. The storage 180 may store a control program for controlling the display apparatus 100 and the controller, an application which is initially provided by a manufacturer or downloaded from an external source, a graphical user interface (GUI) related to the application, an object for providing the GUI (for example, an image text, an icon, a button, etc.), user information, documents, databases, or relevant data.

The term "storage" used herein includes the storage 180, the ROM 112 and the RAM 113 of the controller, or a memory card (for example, a micro SD card, a USB memory (not shown)) mounted in the display apparatus 100. Also, the storage may include a non-volatile memory, a volatile memory, a hard disk drive (HDD) or a solid state drive (SSD).

The storage may include a broadcast receiving module, a channel control module, a volume control module, a communication control module, a voice recognition module, a motion recognition module, a light receiving module, a display control module, an audio control module, an external input control module, a power control module, a voice database (DB) or a motion DB, which is not shown. The modules and the databases of the storage, which are not shown, may be implemented in the form of software to perform a broadcast reception control function, a channel control function, a volume control function, a communication control function, a voice recognition function, a motion recognition function, a light reception control function, a display control function, an audio control function, an external input control function, or a power control function of the display apparatus 100. The controller may perform each function using software stored in the storage.

The storage may store information on whether the display apparatus 100 is in the overall area motion recognition mode or the partial area motion recognition mode under the control of the controller.

The storage may store a distance to a user motion that is calculated under the control of the controller.

The storage may store active area information on the active area that is set in response to user input under the control of the controller. The active area information may include a location of each apex of the active area, a name of the active area, or an active area setting time.

The storage may store the active area information of the active area having an area corresponding to a user motion which is input through the camera.

The storage may store reference information corresponding to initial power supply of the display apparatus 100. The controller may control to automatically display an active area setting screen to set the active area using the reference information.

The storage may calculate the area of the set active area. Also, the storage may calculate an area of the screen.

The storage may store the area of the active area which is set in response to the user motion.

The storage may pre-store a user motion or a kind of user motion to set the active area.

The storage may store information on the disabling motion to disable the partial area motion recognition mode. For example, the disabling motion may include one of spreading user's palm, clenching user's fist, and spreading user's palm and clenching user's fist in a row. The storage may calculate an area of the disabling motion.

The storage may store partial area motion recognition mode information corresponding to the partial area motion recognition mode. For example, the partial area motion recognition mode information may include information on whether the partial area motion recognition mode is set or not, a partial area motion recognition mode change time, etc.

The storage may store first partial area motion recognition mode information corresponding to the first partial area motion recognition mode, or second partial area motion recognition mode information corresponding to the second partial area motion recognition mode. The stored first and/or second partial area motion recognition mode information may be identical to the partial area motion recognition mode information (for example, information on whether the partial area motion recognition mode is set or not, a partial area motion recognition mode change time, etc.).

The storage may store the object corresponding to the partial area motion recognition mode. For example, the object may include an image, a text, an icon, or a button.

The storage may store transparency of the active area setting screen, transparency of the active area setting template, or transparency of the active area.

The storage may store at least one of the visual feedback and the audio feedback corresponding to the disabling of the partial area motion recognition mode. For example, the visual feedback includes a flash or a moving image. The audio feedback includes an outputtable sound.

The storage unit may store the pop-up window corresponding to the maintenance of the partial area motion recognition mode.

The power supply 190 supplies power input from an external power source to the inner elements 120 through 180 of the display apparatus 100 under the control of the controller. Also, the power supply 190 may supply power to one or two or more batteries located in the display apparatus 100 under the control of the controller. The battery to which power is supplied may be located between the display 170 and the back cover 13. Also, the battery may be located in the front cover 12 of the display apparatus 100.

At least one element corresponding to performance of the display apparatus 100 may be added to or deleted from the elements 110 to 190 of the display apparatus 100 of FIGS. 1 and 2. Also, it will be understood by an ordinary skilled person in the related art that locations of the elements 110 to 190 may be changed according to performance or configuration of the display apparatus 100.

FIG. 3 is a flowchart illustrating a method for recognizing a motion of a display apparatus according to an exemplary embodiment.

FIGS. 4A through 7G are views illustrating an example of a method for recognizing a motion of a display apparatus according to one or more exemplary embodiments.

Referring to FIG. 3, an image or a video is displayed at operation S301.

Figure 4A:
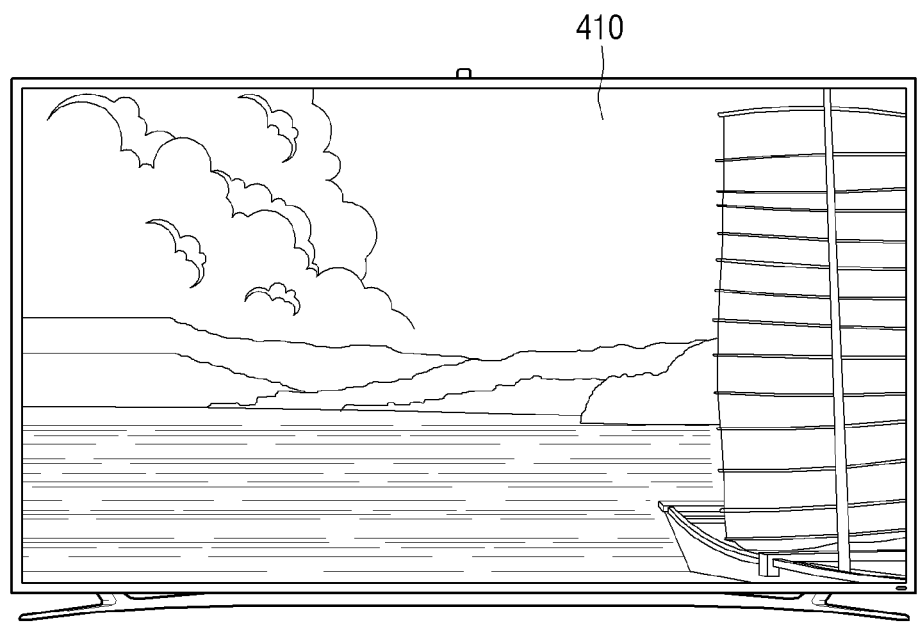
FIGS. 4A through 7G are views illustrating an example of a method for recognizing a motion of a display apparatus according to one or more exemplary embodiments.

Referring to FIG. 4A, the controller displays a video 410, which, for example, includes an image, through the screen of the display apparatus 100.

The displayed video 410 may include at least one of a video which is received through the tuner 120, a video which is received through the communicator 130, a video which is received through the external inputter 160, and a video which is stored in the storage 180. Also, the video may include at least one of an image which is received through the tuner 120, an image which is received through the communicator 130, an image which is received through the external inputter 160, and an image which is stored in the storage 180.

Referring to FIG. 3, an active area is set at operation S302.

The controller may detect an active area setting request which is input through one of the remote controller 200, the microphone 140, the camera 145, and the panel key 14, or combination thereof. The active area setting request may be input through a key of the remote controller 200 (for example, "active area setting key"), a voice input through the microphone 140 (for example, saying "set an active area!"), a motion input through the camera 145 (for example, a motion to set the active area, "clenching user's fist and shaking"), or one key included in the panel key 14 (for example, "active area setting key").

The display apparatus 100 may operate in an overall area motion recognition mode and a partial area motion recognition mode. For example, the controller may operate in the overall area motion recognition mode in which the display apparatus 100 is controlled by a motion that is recognized from a whole recognition range of the camera 145 using the camera 145. Also, the controller may operate in the partial area motion recognition mode in which the display apparatus 100 is controlled only by a motion that is recognized in the active area set by the user input within the recognition range of the camera 145.

The active area refers to a relative area that is displayed on the screen in response to a user motion input through the camera 145. The controller may display a user motion (for example, a 2D video or a 3D video) that is detected on a location distanced away from the display apparatus 100 using the camera 145 on a relative location in the screen. The controller may display the user motion input through the camera 145 on the relative location in the screen corresponding to a distance to the user motion.

The controller may set an area other than the active area as a mask area in the partial area motion recognition mode. In the partial area motion recognition mode, the controller may not recognize a motion that is input through the mask area of the recognition range of the camera 145. Also, in the partial area motion recognition mode, the controller may recognize the motion input through the mask area of the recognition range of the camera 145, but may not control the display apparatus 100 because the mask area is not the active area.

The controller may recognize only a predetermined motion (for example, a disabling motion) that is input through some areas of the recognition range of the camera 145 using the camera. Also, the controller may recognize a motion that is input only through some areas of the recognition range of the camera 145 using the camera 145. Also, the controller may recognize a motion that is input only through some areas of the recognition range of the camera 145 using optical zoom or digital zoom. The area other than some areas of the recognition range of the camera 145 may be processed as the mask area.

When initial power is supplied to the display apparatus and then an initial active area is set, the controller may set the active area in the overall area motion recognition mode.

The "user input" according to an exemplary embodiment includes a key of the remote controller 200, a user voice which is input through the microphone 140, a user motion which is received through the camera 145, or a key of the panel key 14.

Figure 4B:
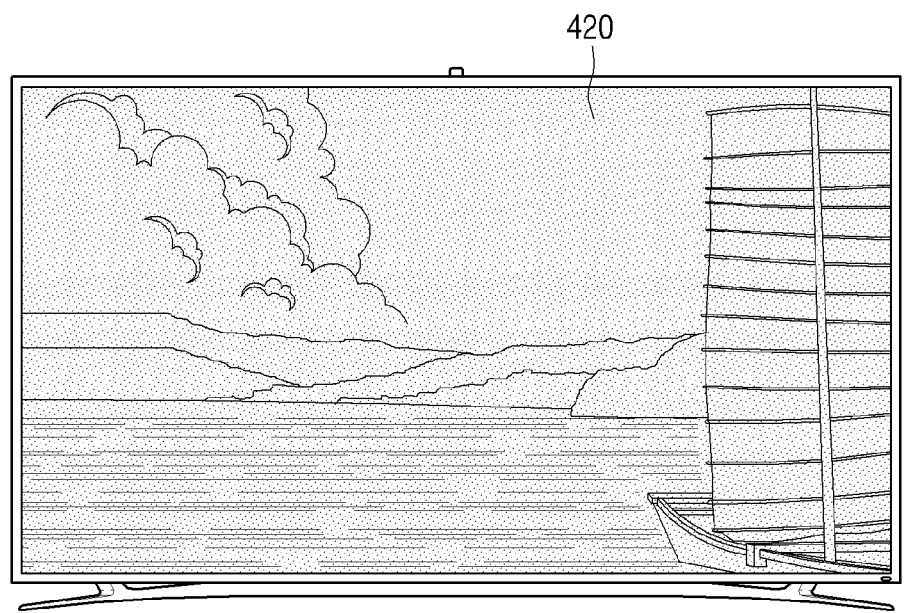
Figure 4C:
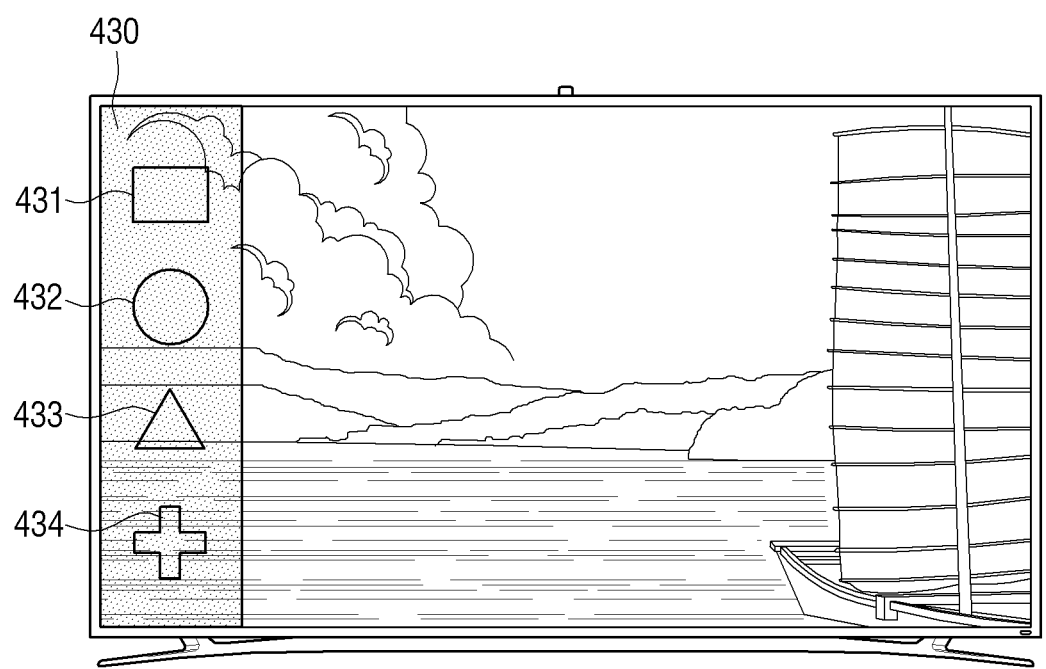

According to another exemplary embodiment, when initial power is supplied to the display apparatus 100, the controller may display an active area setting screen 420 to set the initial active area as shown in FIGS. 4B and 4C.

The controller may confirm whether initial power is supplied or not using reference information corresponding to whether initial power is supplied to the display apparatus 100. For example, the reference information may be set in the form of a flag at the time when the display apparatus 100 is produced. The controller may identify the reference information from the flag and may recognize that initial power is supplied to the display apparatus 100. However, determining whether initial power is supplied or not should not be limited to the reference information and could be easily understood by an ordinary skilled person of the related art.

Referring to FIG. 4B, the controller has the video 410 overlaid with the active area setting screen 420 to set the active area in response to the active area setting request. The active area setting screen 420 having transparency (for example, 0 to 100%) is displayed along with the video 410. When the active area setting screen 420 without transparency is displayed, only the active area setting screen 420 without transparency may be displayed. The video 410 is hidden from the active area setting screen 420 without transparency and is not displayed. Also, when a predetermined time (for example, 500 msec) elapses, the active area setting screen 420 may not be displayed and only the video 410 may be displayed.

Referring to FIG. 4C, the controller may display an active area setting template 430 on one side of the active area setting screen 420. The video 410 may be overlaid with the active area setting template 430 having transparency. The active area setting template 430 may be formed on one of the four sides of the video 410. The active area setting screen 420 may be overlaid with the active area setting template 430 having transparency. The active area setting template 430 may be formed on one of the four sides of the active area setting screen 420.

The active area setting template 430 may include a rectangular template 431, a circular template 432, a triangular template 433, or a crisscross template 434. Also, it will be understood by an ordinary skilled person in the related art that the active area setting template 430 includes various templates (for example, a heart shape template, etc.) in addition to the shown templates 431 to 434.

When the rectangular template 431, which is selected by the user input (for example, a direction key of the remote controller 200, a user voice (for example, saying "Move the rectangular template!"), a user motion (for example, "clenching user's fist and moving"), or a direction key of the panel key 14), is dragged and dropped on the video 410, the controller may display the rectangular template 431 on a drag and drop location in the video 410.

According to another exemplary embodiment, a free form option may be provided in addition to the templates. The controller may control to set the active area by tracking an area drawn by a user by using the camera to track the user's motion. For example, a user may extend an index finger and outline a shape such as an oval, triangle, or any other shape defined by a continuous outer edge that encircles and internal sub area of the overall screen that can be defined as the active area and the portions remaining that falls outside the edge can be a masked area where inputs are ignored.

Figure 4D:
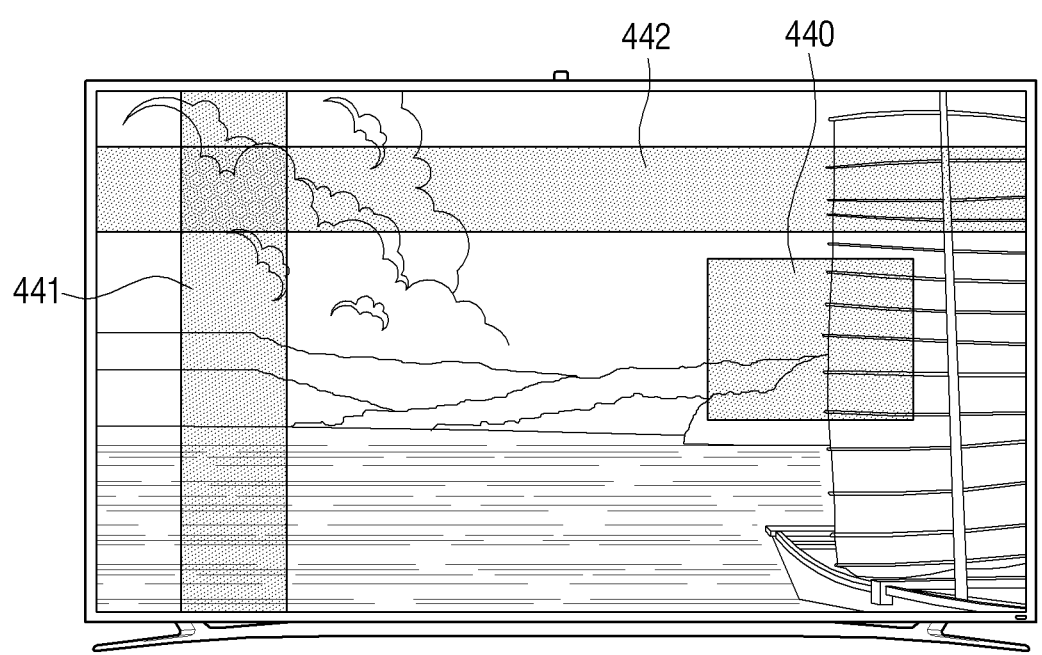

Referring to FIG. 4D, a single rectangular template that has its location, size, and/or shape changed according to user input is displayed. The location of the rectangular template 431 may be changed by dragging and dropping and the size and/or shape of the rectangular template 431 may be changed according to user input. The controller may display the rectangular template which has its location, size, and/or shape changed according to the user input. For example, the changed rectangular template may include one of a rectangular area 440, a vertical bar area 441, and a horizontal bar area 442 or a combination of the rectangular area 440, the vertical bar area 441 and the horizontal bar area 442. However, it will be understood by an ordinary skilled person in the related art that this should not be considered as limiting. A single rectangular area or a plurality of rectangular areas may be displayed by user input.

A user motion received through the camera 145 (for example, a motion of moving the location of the rectangular template or changing the size of the rectangular template) may correspond to the recognition range of the camera 145 and may be displayed on a relative location in the screen. The controller may control the rectangular template 440 to 442 displayed on the screen using the motion recognized through the camera 145.

The controller may display the rectangular area 440 which has its location, size, and/or shape changed according to user input on the screen. When there is no user input for a predetermined time (for example, 1 sec.), the controller may determine the rectangular area 440 as a preliminary active area 440a (see FIG. 4E).

The controller may display the respective rectangular areas 440 to 442 which have their locations, sizes, and/or shapes changed according to user input on the screen. When there is no user input for a predetermined time (for example, 1 sec.), the controller may determine all of the rectangular areas 440 to 442 as preliminary active areas 440a. Specifically, according to an exemplary embodiment, a user may define two sub areas that do not touch but reside within the overall screen as active areas. For example, looking at FIG. 4D, a user may place all three template blocks as shown while also adjusting their dimensions as described above to fit the visual description shown in the figure. Further, the user may then select these areas to be defined as active areas by either an affirmative signal being sent to the display apparatus, or by waiting for a certain time to pass as described above.

Figure 4E:
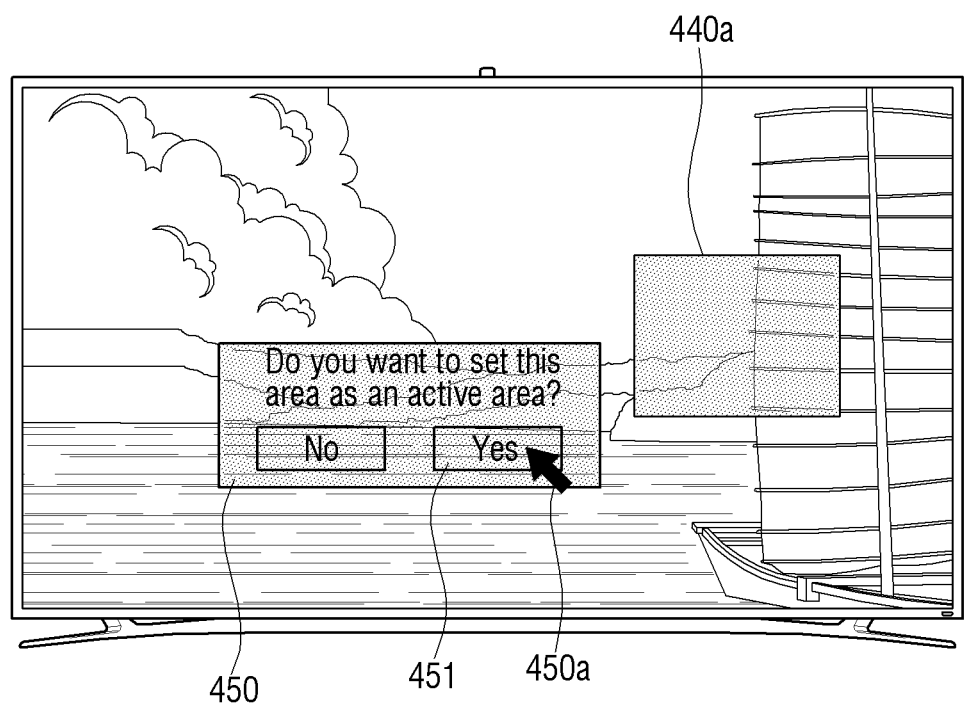

Referring to FIG. 4E, the controller displays a pop-up window 450 and/or a pointer 450a to set the active area. The pointer 450a may be placed on Yes 451 as default. When Yes 451 is selected by user input, the controller may set the preliminary active area 440a to an active area 443. The controller may store active area information (for example, a location of each apex of the active area, a name of the active area, an active area setting time, etc.) corresponding to the active area 443 in the storage 180.

For example, the set active area may be the rectangular active area 443. An area of the set active area 443 may be smaller than a screen area of the display apparatus 100.

The controller may set a plurality of active areas corresponding to the plurality of preliminary active areas displayed by the user input. The controller may store active area information corresponding to each of the plurality of active areas in the storage. A sum of the areas of the plurality of active areas may be smaller than the screen area of the display apparatus 100.

According to another exemplary embodiment, the active area may be automatically set using the camera 145 under the control of the controller in addition to the user input.

For example, according to an exemplary embodiment, a camera 145 may receive and store one or more image samples of the entire viewing area of the camera. These samples may be analyzed to determine which areas of the viewing area, and therefore the corresponding portions of the screen, contain the least amount of activity from the user and may then set or provide these areas as active areas.

When an active area setting request is detected, the controller may detect a user motion through the camera 145 according to predetermined setting. When initial power is supplied to the display apparatus 100, the controller may automatically determine the active area setting request without user input. The predetermined setting may be auto setting of the active area.

The user motion may include a motion of a part of a user's body or a motion of a part of the user, such as user's face, look, hand, fist, and finger. User body information corresponding to a part of the user body (for example, hand) to automatically set the active area may be pre-stored in the storage.

In response to auto setting of the active area, the controller may operate the camera 145, recognize a user motion using the camera 145, output a motion recognition result, and store the motion recognition result in the storage. The predetermined setting may be stored in the storage. The predetermined setting may be set to be performed by initial power supply to the display apparatus or user input under the control of the controller.

A user motion that is recognizable by the display apparatus 100 may include a motion of a part of the user body or a motion of a part of the user, such as user's face, look, hand, fist, and finger. A single user motion or a plurality of user motions may be displayed on the display apparatus 100 in response to the motion recognition result, and motions of a plurality of users may be recognized.

The controller may display at least one recognized user motion on the active area setting screen 420 or the video 410.

One of the at least one user motion recognized and displayed on the screen of the display apparatus 100 may correspond to the active area setting by user input and may be selected. A plurality of user motions of the at least one user motion displayed may correspond to the active area setting by user input and may be selected.

The controller may calculate an area of the determined user motion. The controller may calculate an area of an active area corresponding to the user motion according to the calculated area of the user motion. The controller may set the area of the active area to be 110 to 400% of the area of the user motion. The area of the active area may be larger than the area of the user motion. However, it will be understood by an ordinary skilled person in the related art that the area of the active area may be determined considering recognition efficiency of motion recognition.

According to another exemplary embodiment, a sum of areas of a plurality of active areas corresponding to a plurality of user motions may be smaller than the screen area of the display apparatus 100.

The controller may change the size and/or shape of the set active area according to user input.

Referring to FIG. 3, when the active area is set at operation S302, operation S303 is performed.

Referring to FIG. 3, a disabling motion is set at operation S303.

When the active area is set, the controller sets a user motion which is input using the camera 145 as a disabling motion to disable the partial area motion recognition mode of the display apparatus 100. The recognition range of the camera 145 in the overall area motion recognition mode of the display apparatus 100 may be a distance within 1.5 to 4 m from the camera 145 to a user location. The recognition range of the camera 145 may vary according to an angle of the camera and an environment condition.

The display apparatus 100 may include the overall area motion recognition mode in which the display apparatus 100 is controllable by a user motion that is recognized in the recognition range of the camera 145, and the partial area motion recognition mode in which the display apparatus 100 is controllable by a user motion that is recognized only in the set active area of the recognition range of the camera 145.

Figure 5A:
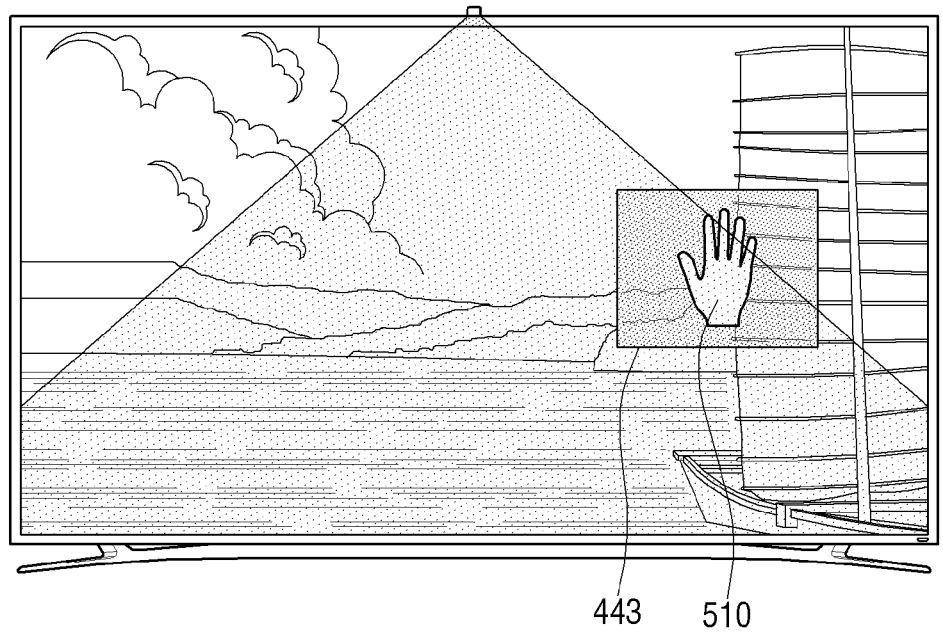
Figure 5B:
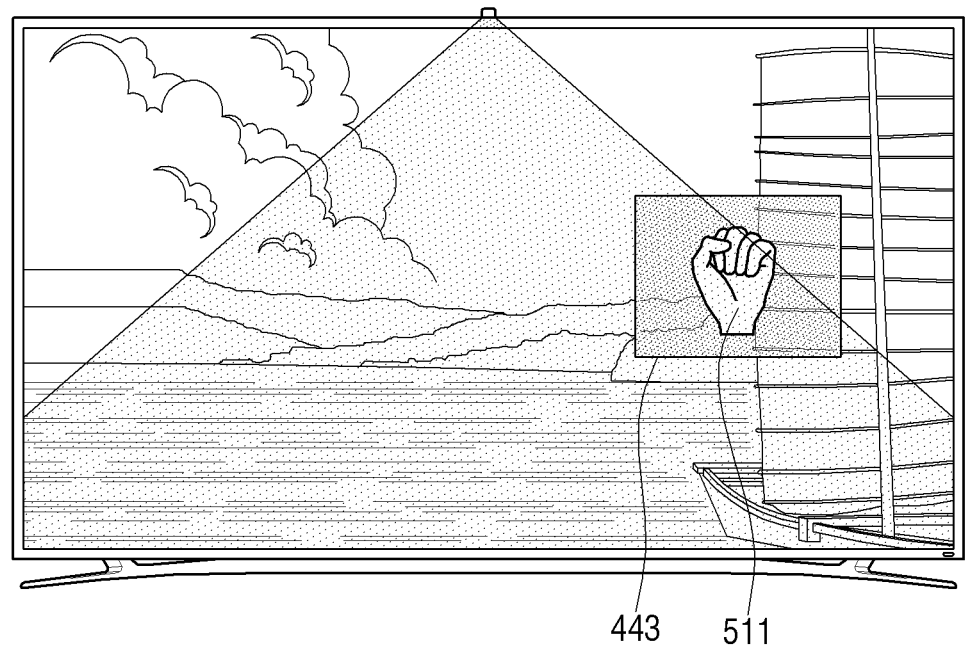
Figure 5C:
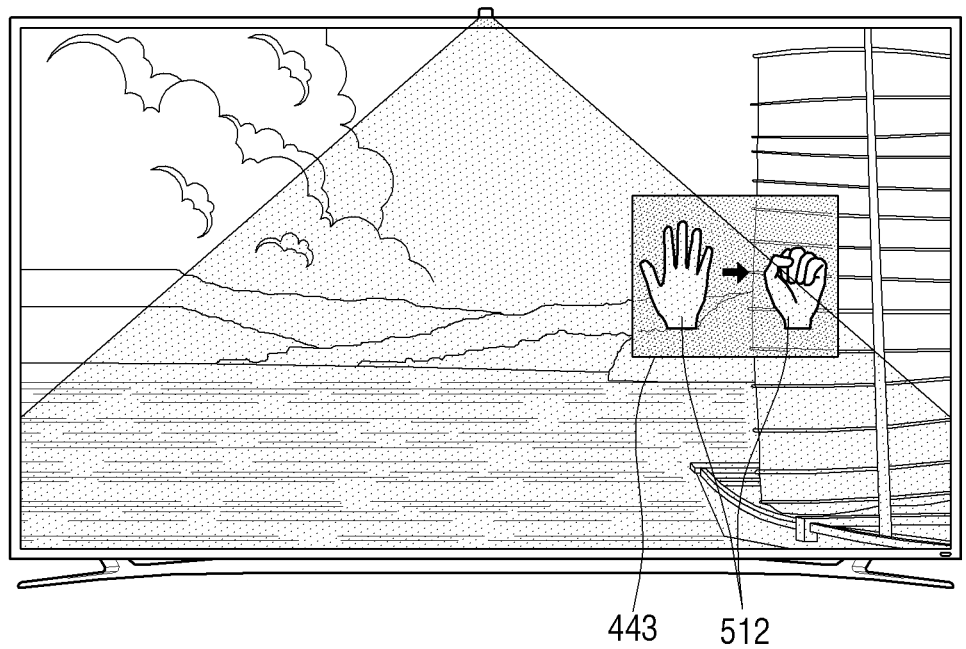

Referring to FIGS. 5A to 5C, the controller may detect a user motion which is input through the camera 145 from an active area 443. The controller may analyze the input user motion and may set the motion to a disabling motion that is detected only in the active area 443. For example, the set disabling motion may include one of spreading user's palm 510, clenching user's fist 511, and spreading user's palm and clenching user's fist in a row 512. Also, a single disabling motion or a plurality of disabling motions may be set. For example, disabling motions corresponding to respective users may be set.

Two lines extending from the camera 145 are just to express the recognition range of the camera 145 2-dimensionally, and are not intended to limit the recognition range of the camera 145.

According to another exemplary embodiment, the controller may detect the disabling motion within the recognition range of the camera 145 in addition to the active area 443 set at operation S302. Detecting the disabling motion within the recognition range of the camera 145 may be substantially identical to detecting the disabling motion in the active area 433 and thus a redundant explanation is omitted.

The disabling motion 510 to 512 displayed on the active area 443 may imply that a user motion is input at a relative location distanced away from the display apparatus 100 and corresponding to the active area 433.

When a part of the user motion input through the camera 145 is displayed on the active area 443, the user may use the visual feedback as a guide to input a user motion to the active area 443.

The controller may calculate an area of a disabling motion corresponding to the set disabling motion 510 to 512. The controller may calculate the area of the disabling motion using an outline of the disabling motion. The outline of the disabling motion may include a close curve or an open curve. Also, the outline may be a straight line rather than a curve. For example, the area of the disabling motion 510 to 512 may include a face area, an area of spread palm, an area of clenched fist, or an area of spread palm and clenched fist. Calculating the area using the outline will be easily understood by an ordinary skilled person in the related art.

Figure 5D:
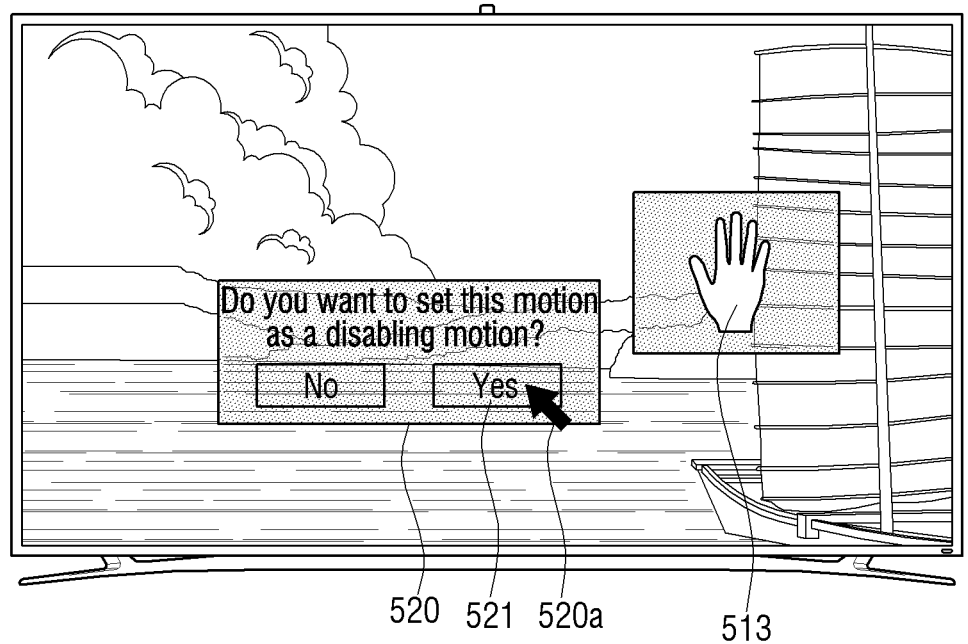

Referring to FIG. 5D, the controller may determine effectiveness of the active area 443 using the calculated area of the disabling motion. When the area of the set active area 443 is larger than the area of the disabling motion (for example, 510), the controller displays a pop-up window 520 and/or a pointer 520a to set the disabling motion of the user.

Menus like Yes 521 and No may be displayed in the pop-up window 520. The pointer 520a may be placed on Yes 521 as default. When Yes 521 is selected by user input, the controller may set the preliminary disabling motion (for example, 510) as a disabling motion 513. The controller may store disabling motion information (for example, shape, size, area, name of the disabling motion, or a disabling motion setting time etc.) corresponding to the disabling motion 513 in the storage.

When the area of the active area 443 is smaller than the area of the disabling motion (for example, 510), the controller may display a pop-up window corresponding to a disabling motion setting error on the screen. The user may re-set the disabling motion in response to the disabling motion setting error.

The setting the disabling motion (S303) may be performed earlier than the setting the active area (S302). For example, when the disabling motion is set first, the controller may set the active area using the user motion input in the recognition range of the camera 145.

Referring to FIG. 3, when the disabling motion is set at operation S303, operation S304 may be performed.

Referring to FIG. 3, the overall area motion recognition mode is changed to the partial area motion recognition mode at operation S304.

Figure 6A:
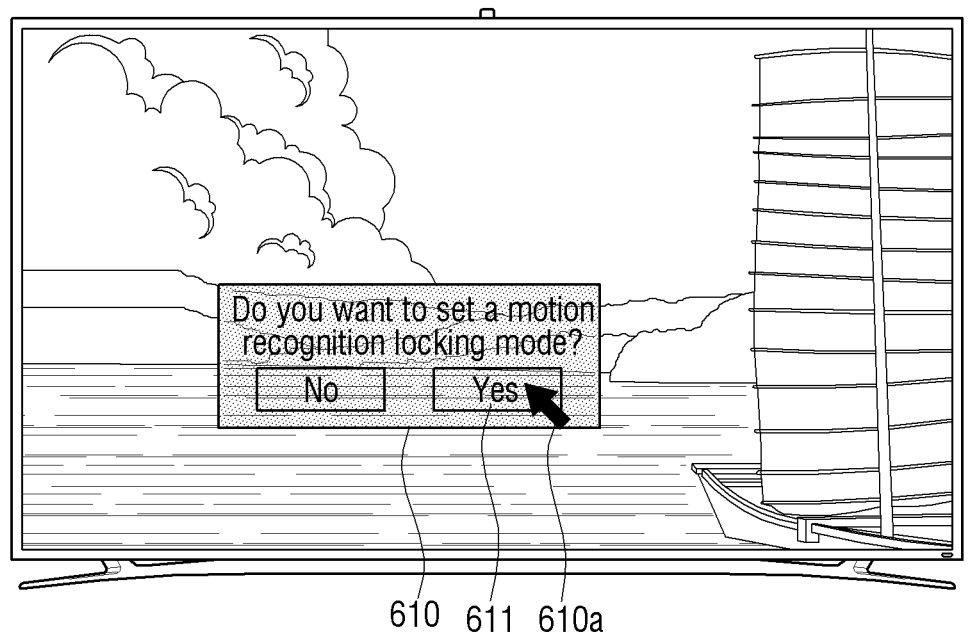

Referring to FIG. 6A, when user input to change to the partial area motion recognition mode is received, the controller displays a pop-up window 610 and/or a pointer 610a to change to a motion recognition lock mode on the screen. The pointer 610a may be placed on Yes 611 as default. When Yes 611 is selected by user input, the controller may change the overall area motion recognition mode of the display apparatus 100 to the partial area motion recognition mode. The controller may store partial area motion recognition mode information (for example, information on whether the partial area motion recognition mode is set or not, a partial area motion recognition mode change time, etc.) corresponding to the motion recognition lock mode in the storage.

Figure 6B:
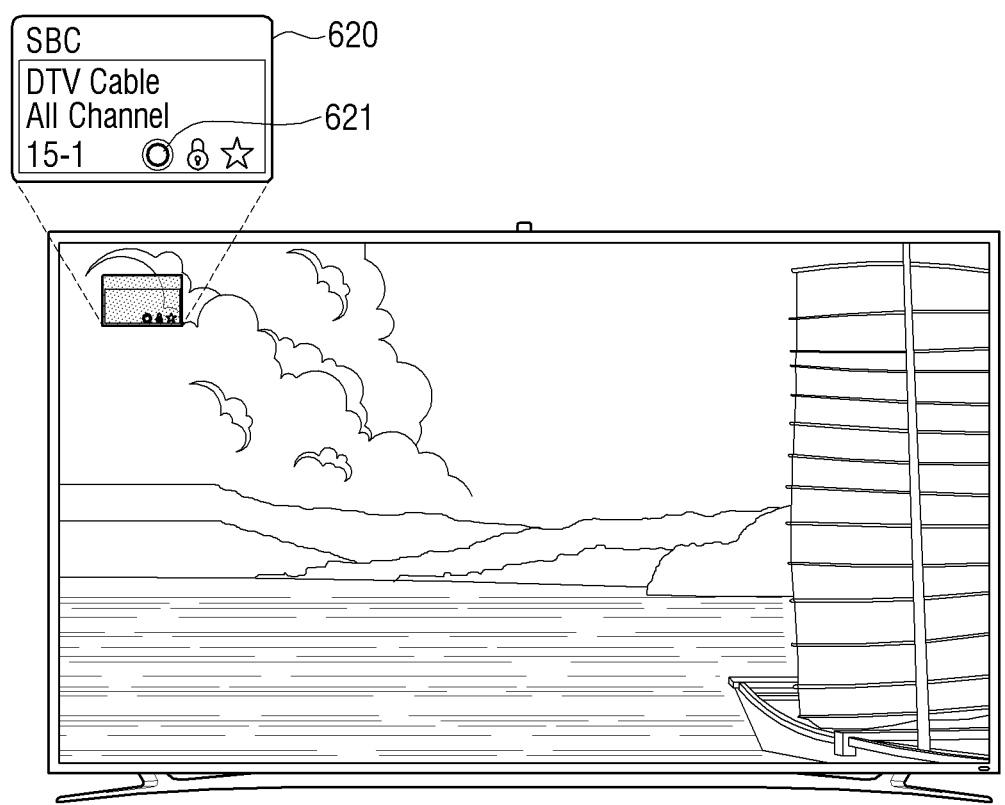

Referring to FIG. 6B, the controller displays an object 621 corresponding to the changed partial area motion recognition mode on channel information 620 displayed on one side of the screen. The displayed object 621 may include an image, a text, an icon, or a button, for example. The channel information 620 may include a broadcasting station name of the video, information on whether the broadcast is a terrestrial broadcast or a cable broadcast, a channel number, a preferred channel, etc. The controller may display the channel information 620 for a predetermined time (for example, 1 sec.) on the screen. The controller may display the object 621 on an area other than the area of the channel information 620 and may display the object 621 for a predetermined time (for example, 1 sec.)

Referring to FIG. 3, when the overall area motion recognition mode is changed to the partial area motion recognition mode at operation S304, operation S305 may be performed.

Referring to FIG. 3, a disabling motion is recognized in the active area at operation S305.

Figure 7A:
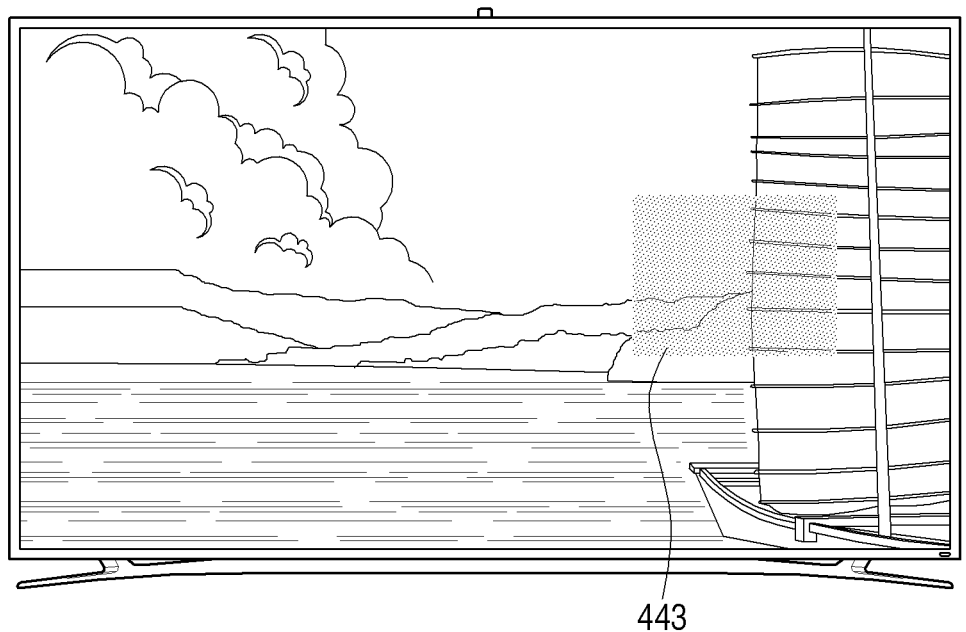

Referring to FIG. 7A, the display apparatus 100 is in the partial area motion recognition mode. The controller may display the active area 433 having transparency on the screen in response to the change to the partial area motion recognition mode of the display apparatus 100. The transparency of the displayed active area 443 is set to distinguish between the video and the active area 443.

Figure 7B:
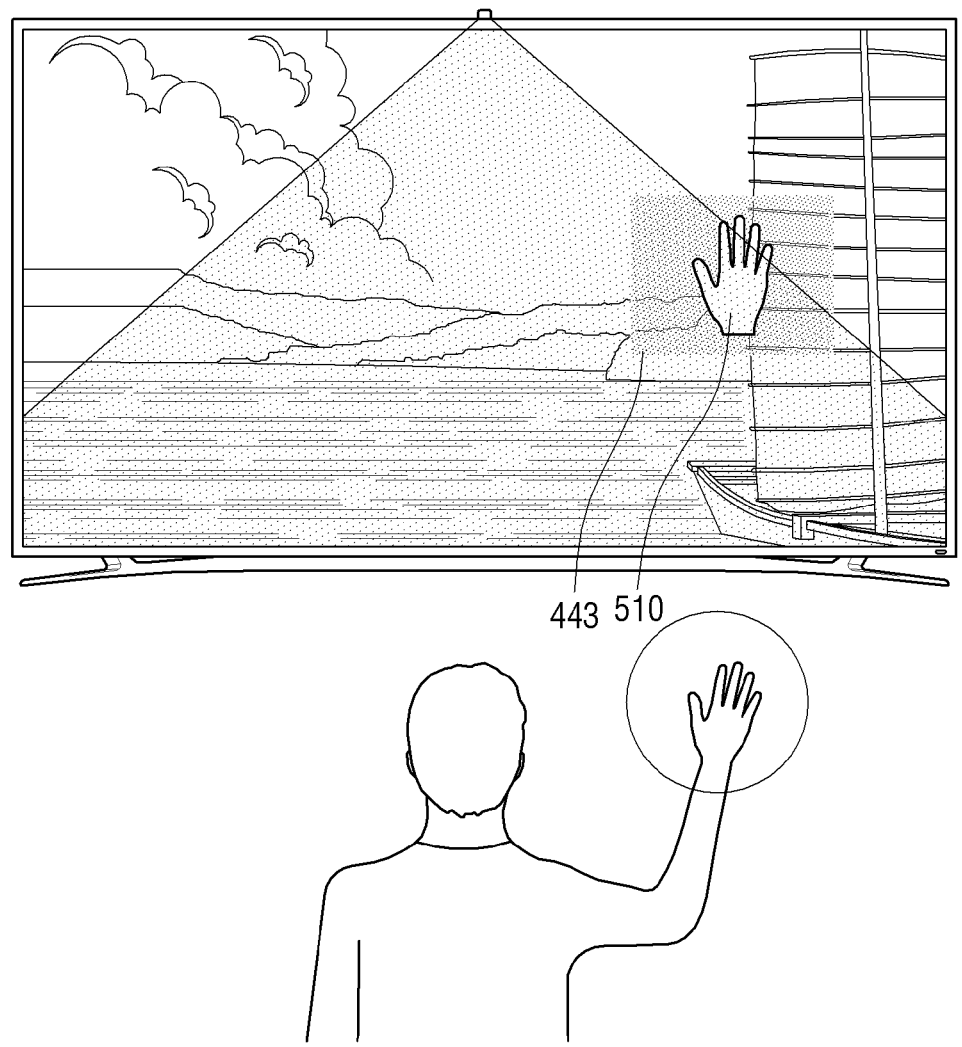

Referring to FIG. 7B, the controller may determine a relative location of a user motion 510 input through the camera 145 in the screen of the display apparatus 100. The controller may determine whether the user motion 510 input through the camera 145 is recognizable in the active area 433. The controller may display a relative location of the user motion 510 in the active area. Also, the controller may display the relative location of the recognized user motion 510 along with the active area. The controller may display a part or whole of the user motion 510 recognized in the active area 433 in response to a motion recognition result.

Referring to FIG. 3, it is determined whether the recognized motion is identical to the disabling motion or not at operation S306.

The controller may compare the motion recognized in the active area 443 with the disabling motion information stored in the storage. The controller may determine whether the recognized motion is identical to the disabling motion or not according to a result of the comparing the recognized motion with the disabling motion information.

Referring to FIG. 3, when the recognized motion is identical to the disabling motion at operation S306, operation S307 may be performed.

Referring to FIG. 3, the partial area motion recognition mode is disabled at operation S307.

Figure 7C:
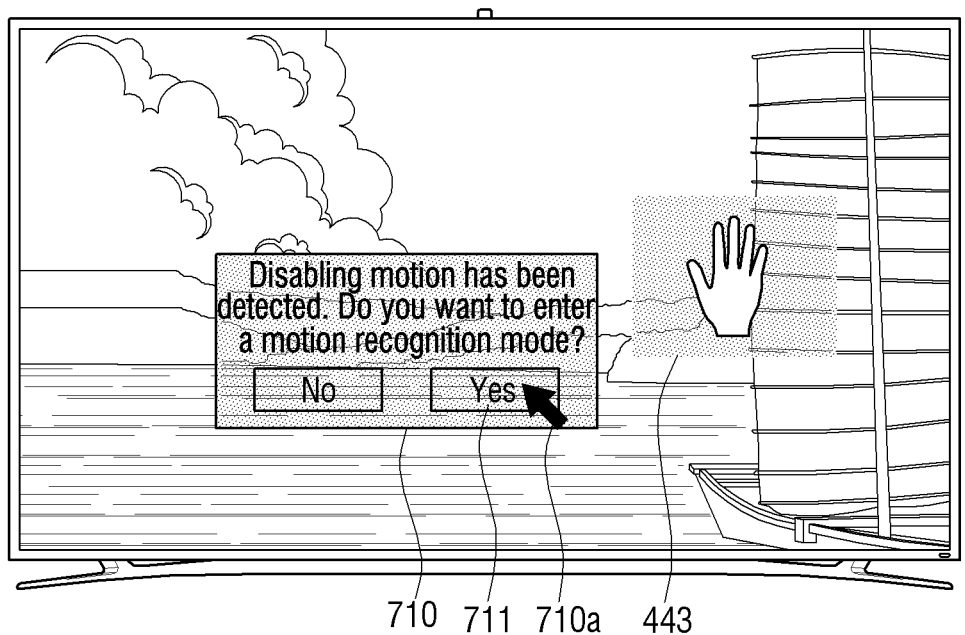

Referring to FIG. 7C, when the recognized motion is identical to the disabling motion, the controller displays a pop-up window 710 and/or a pointer 710a to disable the partial area motion recognition mode on the screen. The pointer 710a may be placed on Yes 711 as default. When Yes 711 is selected by user input, the controller may disable the partial area motion recognition mode of the display apparatus 100. Also, when the pop-up window 710 and/or the pointer 710a are displayed and user input is not received for a predetermined time (for example, 500 msec.), the controller may disable the partial area motion recognition mode of the display apparatus 100.

According to another exemplary embodiment, the partial area motion recognition mode may be disabled without display of the pop-up window 710 and/or the pointer 710a. For example, when the recognized motion is identical to the disabling motion, the controller may not display a notice (for example, the pop-up window 710 and/or the pointer 710a) corresponding to the disabling of the partial area motion recognition mode and may disable the partial area motion recognition mode. The controller may automatically disable the partial area motion recognition mode.

Referring to FIG. 3, the partial area motion recognition mode is changed to the overall area motion recognition mode at operation S308.

Figure 7D:
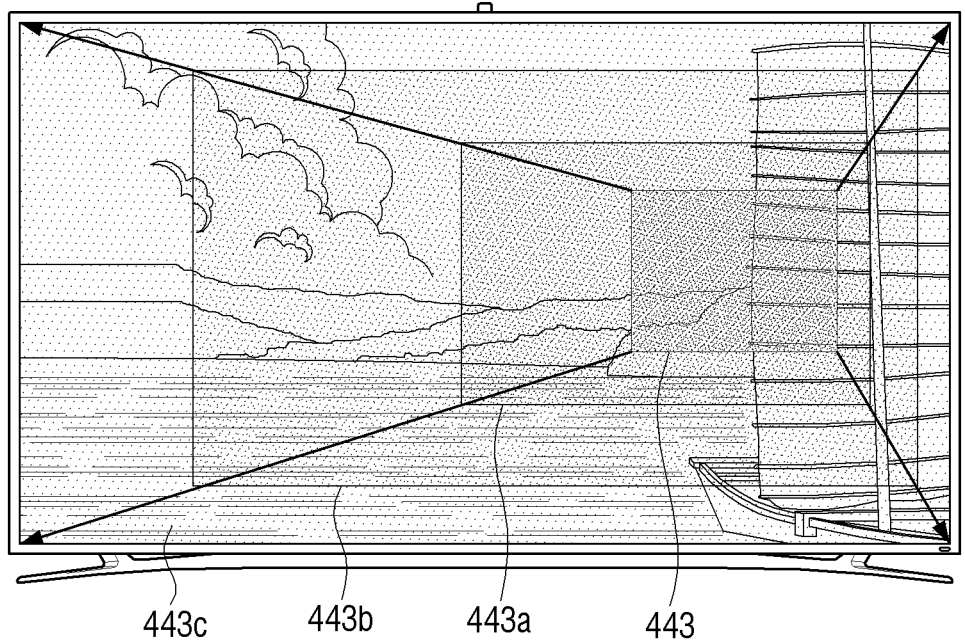

Referring to FIG. 7D, the controller changes the partial area motion recognition mode of the display apparatus 100 to the overall area motion recognition mode. The controller may provide the user with visual feedback corresponding to the change to the overall area motion recognition mode. The visual feedback may be expressed as if the active area 433 is gradually enlarged into the full size of the screen at constant velocity (443→443a→443b→443c). Also, the controller may provide visual feedback corresponding to the change to the overall area motion recognition mode, such as a separate flash or moving image, on the screen other than the active area 433.

The controller may output audio feedback (for example, a sound) corresponding to the change to the overall area motion recognition mode through the audio outputter 175. The controller may provide the user with one of the visual feedback and the audio feedback corresponding to the change to the overall area motion recognition mode, or may provide the user with a combination of the visual feedback and the audio feedback.

The controller may change the partial area motion recognition mode to the overall area motion recognition mode without providing separate feedback.

Figure 7E:
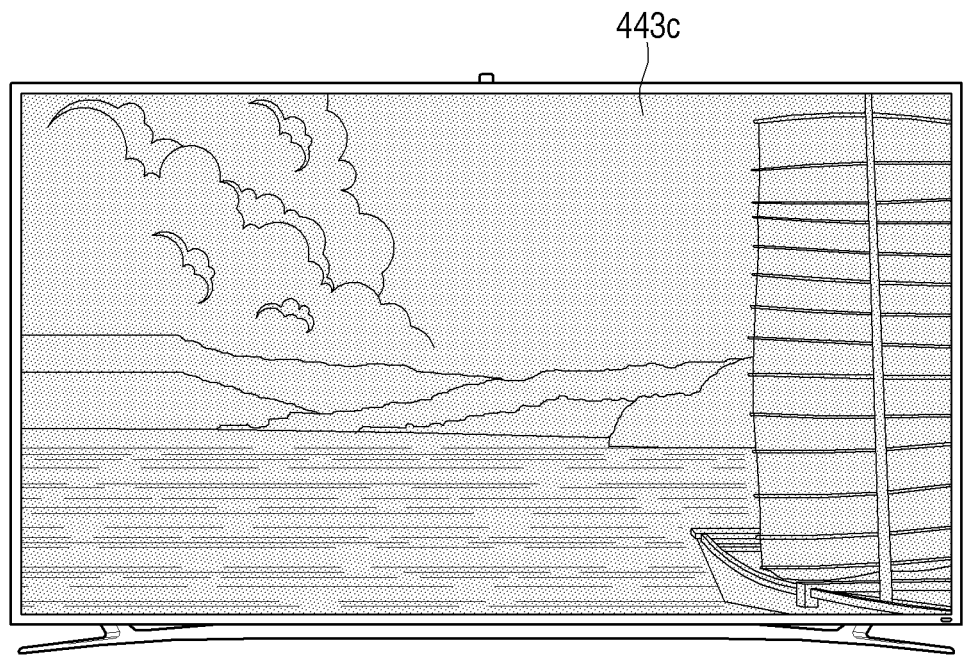

FIG. 7E illustrates the display apparatus 100 which has changed the partial area motion recognition mode to the overall area motion recognition mode. The controller may display an active area 443c which has been extended to the full size of the screen. The display apparatus 100, which has changed the partial area motion recognition mode to the overall area motion recognition mode, may recognize a user motion which is input in the recognition range of the camera 145. In the overall area motion recognition mode, the controller may control the display apparatus 100 (for example, changing a channel, etc.) in response to the user motion which is input through the camera 145. Particularly, the controller may control the display apparatus 100 in response to the user motion being received through any part of a viewing frustum or a field of view of the camera.

According to another exemplary embodiment, when the recognized motion is identical to a first disabling motion, the controller may maintain the partial area motion recognition mode (for example, a second partial area motion recognition mode). The partial area motion recognition mode may include a first partial area motion recognition mode and a second partial area motion recognition mode. When the recognized motion is identical to the disabling motion 510, the first partial area motion recognition mode refers to a partial area motion recognition mode in which the partial area motion recognition mode is changed to the overall area motion recognition mode. When the recognized motion is identical to a first disabling motion (not shown, for example, a gesture of holding up the V sign with fingers), the second partial area motion recognition mode refers to a partial area motion recognition mode in which the partial area motion recognition mode is maintained. The disabling motion and the first disabling motion may be different.

The controller may set the partial area motion recognition mode to one of the first partial area motion recognition mode and the second partial area motion recognition mode according to user input (for example, the first partial area motion recognition mode is set as default). When the recognized motion is identical to the disabling motion and the first disabling motion, the controller may display a pop-up window and/or an indicator corresponding to selection of one of the first partial area motion recognition mode and the second partial area motion recognition mode. When the recognized motion is identical to the disabling motion, the pop-up window may display a message saying "Disabling motion has been recognized. Do you want to change to the first partial area motion recognition mode?". Also, when the recognized motion is identical to the first disabling motion, the pop-up window may display a message saying "First disabling motion has been recognized. Do you want to change to the second partial area motion recognition mode?". When the second partial area motion recognition mode is selected, the controller may maintain the partial area motion recognition mode in response to the selection of the second partial area motion recognition mode.

When the first partial area motion recognition mode is selected, the controller may disable the partial area motion recognition mode in response to the selection of the first partial area motion recognition mode.

The controller may provide the user with visual feedback corresponding to the second partial area motion recognition mode. The visual feedback may be expressed as if the screen is gradually reduced to the active area 433 at constant velocity (443c→443b→443a→443). Also, the controller may provide visual feedback corresponding to the change to the overall area motion recognition mode, such as a separate flash or moving image, on the screen other than the active area 433.

The controller may output audio feedback (for example, a sound) corresponding to the second partial area motion recognition mode through the audio outputter 175. The controller may provide the user with one of the visual feedback and the audio feedback corresponding to the change to the overall area motion recognition mode, or may provide the user with a combination of the visual feedback and the audio feedback.

The controller may maintain the partial area motion recognition mode according to the second partial area motion recognition mode without providing separate feedback.

In the second partial area motion recognition mode, the controller may recognize a user motion in the active area 433. In the second partial area motion recognition mode, the controller may control the display apparatus 100 (for example, adjust a volume) in response to recognition of the user motion in the active area 433 using the camera 145.

Also, when the disabling motion 510 is input in the active area in the second partial area motion recognition mode, the controller may change the second partial area motion recognition mode to the overall area motion recognition mode.

Referring to FIG. 3, when the partial area motion recognition mode is changed to the overall area motion recognition mode at operation S308, the motion recognition method of the display apparatus is finished.

When the recognized motion is different from the disabling motion at operation S306, operation S309 may be performed.

The partial area motion recognition mode is maintained at operation S309.

Figure 7F:
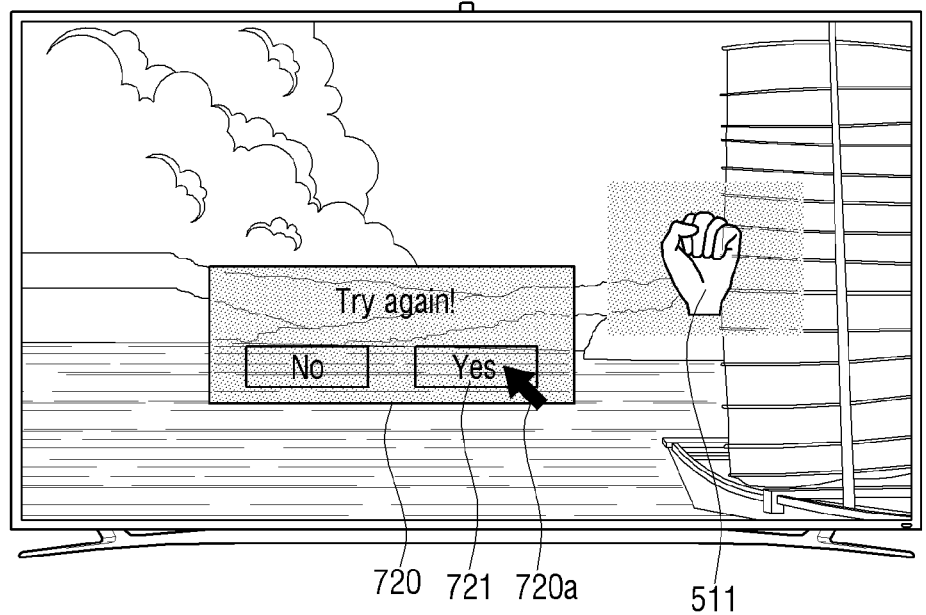

Referring to FIG. 7F, when the motion recognized in the active area 443 is different from the disabling motion information stored in the storage (for example, the recognized user motion 511 is different from the disabling motion information corresponding to the disabling motion 510), the controller may display a pop-up window 720 and/or a pointer 720a to maintain the partial area motion recognition mode on the screen. The pointer 720a may be placed on Yes 721 as default. When Yes 721 is selected by user input, the controller may additionally recognize a user motion in the active area 433.

Figure 7G:
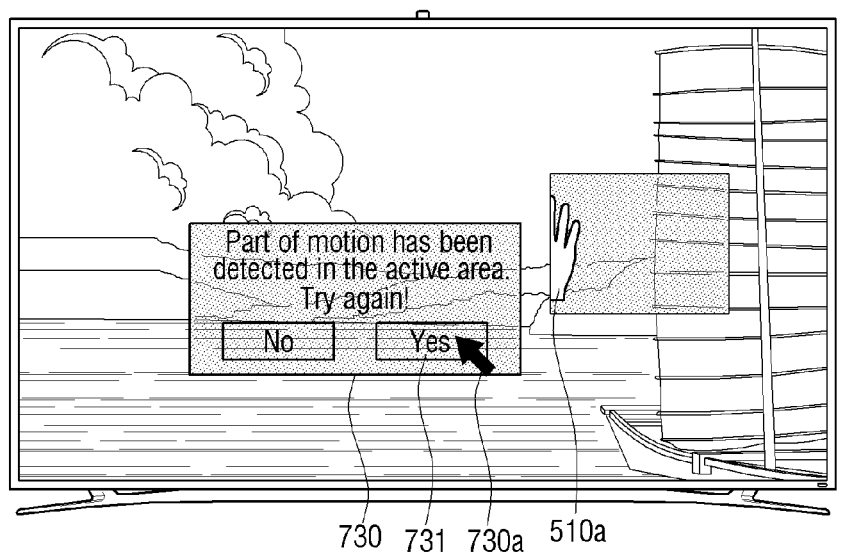

Referring to FIG. 7G, when the motion recognized in the active area 443 is different from the disabling motion information stored in the storage (for example, a part of the recognized user motion 510a is different from the disabling motion 510), the controller may display a pop-up window 730 and/or a pointer 730a to maintain the partial area motion recognition mode on the screen. The pop-up window 730 may be used as a guide for the user to input a user motion to the active area 443.

The controller may move the location of the active area 433 or increase the area of the active area 433 in response to the part of the user motion 510a. Enlarging the active area 433 may be determined according to an area of the part of the motion 510a. For example, when the part of the user motion 510a is 50% of the disabling motion 510, the controller may move the active area 433 toward the other part of the motion 510a. Also, when the part of the user motion 510a is 50% of the disabling motion 510, the controller may increase the area of the active area 433 by 300%. The pointer 720a may be placed on Yes 731 as default. When Yes 731 is selected by user input, the controller may additionally recognize a user motion in the active area 433.

In FIG. 3, when the partial area motion recognition mode is maintained at operation S309, the motion recognition method of the display apparatus may be finished.

The methods according to exemplary embodiments may be implemented in the form of a program command that can be performed through various computing means and may be recorded on a computer readable medium. The computer readable medium may include a program command, a data file, a data structure, etc. independently or in combination. For example, the computer readable medium may be stored in a volatile or non-volatile storage apparatus such as a ROM, a memory such as a RAM, a memory chip, and an integrated circuit, or a storage medium which can optically and magnetically record and is readable by an apparatus (for example, a computer) such as a CD, a DVD, a magnetic disk, or a magnetic tape, regardless whether the computer readable medium is deletable or re-recordable. A memory included in a mobile terminal is an example of a storage medium that is readable by an apparatus which is adapted to store a program or programs including indications to implement the exemplary embodiments. A program command recorded on the medium is designed or configured for the sake of the present disclosure or is well known to an ordinary skilled person in the related art and usable.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for recognizing an external motion with a display apparatus, the method comprising:
    setting an active area in which the external motion is recognizable, wherein the active area corresponds to a portion on a screen of the display apparatus;
    changing the display apparatus from an overall area motion recognition mode to a partial area motion recognition mode, the partial area motion recognition mode configured to recognize the external motion in the active area indicating an area where the display apparatus in a fixed state recognizes the external motion of a user;
    recognizing the external motion in the active area, the external motion being provided away from the screen of the display apparatus; and
    disabling the partial area motion recognition mode in response to the recognized external motion being a disabling motion configured to disable the partial area motion recognition mode,
    wherein the set active area is changeable to a plurality of different forms by an input from the user.

2. The method of claim 1, wherein the active area is set by at least one of a remote controller, voice recognition, motion recognition, and a panel key.

3. The method of claim 1, wherein one of a location, a size, and a shape of the active area is set through an active area setting template displayed on the screen.

4. The method of claim 1, wherein the active area is automatically set to be larger than an area of a part of a user's body input through a camera.

5. The method of claim 4, further comprising storing user body information corresponding to the part of the user's body to automatically set the active area.

6. The method of claim 1, wherein the active area is smaller than an area of the screen.

7. The method of claim 1, further comprising automatically displaying an active area setting screen to set the active area in response to initial power being supplied to the display apparatus.

8. The method of claim 1, further comprising:
    setting the disabling motion,
    wherein the disabling motion is set in at least one of the active area using a camera, and in a recognition range of the camera.

9. The method of claim 1, wherein the active area is larger than a recognition area of the recognized disabling motion.

10. The method of claim 1, wherein the changing the overall area motion recognition mode to the partial area motion recognition mode comprises:
    displaying an object corresponding to the partial area motion recognition mode on one side of the screen in response to the change from the overall area motion recognition mode to the partial area motion recognition mode.

11. The method of claim 1, wherein the changing the overall area motion recognition mode to the partial area motion recognition mode comprises:
    displaying the active area having transparency distinguishably from content on the screen in response to the change from the overall area motion recognition mode to the partial area motion recognition mode.

12. The method of claim 1, wherein the changing the overall area motion recognition mode to the partial area motion recognition mode comprises:
    providing at least one of visual feedback and audio feedback in response to the change from the overall area motion recognition mode to the partial area motion recognition mode.

13. The method of claim 1, wherein the active area is a relative area in the screen configured to recognize the disabling motion which is received through a camera.

14. The method of claim 1, further comprising maintaining the partial area motion recognition mode in response to the recognized external motion being different from the disabling motion.

15. The method of claim 14, wherein the maintaining the partial area motion recognition mode comprises:
    displaying a pop-up window corresponding to the maintained partial area motion recognition mode on the screen in response to the recognized external motion being different from the disabling motion.

16. A method for recognizing an external motion with a display apparatus, the method comprising:
    changing the display apparatus from an overall area motion recognition mode to a partial area motion recognition mode;
    recognizing the external motion that is input in an active area set in the partial area motion recognition mode, the external motion being provided away from a screen of the display apparatus; and
    changing the partial area motion recognition mode to the overall area motion recognition mode in response to the recognized external motion matching a stored disabling motion to disable the partial area motion recognition mode,
    wherein the active area is an area where the display apparatus in a fixed state recognizes the external motion of a user and a relative area in the screen of the display apparatus configured to recognize the external motion that is externally input to the display apparatus through a camera, and
    wherein the set active area is changeable to a plurality of different forms by an input from the user.

17. A method for recognizing an externally input motion with a display apparatus, the method comprising:
    setting an active area in which the externally input motion is recognizable, wherein the active area corresponds to a portion on a screen of the display apparatus;
    changing the display apparatus from an overall area motion recognition mode to a partial area motion recognition mode, wherein the partial area motion recognition mode comprises a first partial area motion recognition mode in which the partial area motion recognition mode is disabled in response to a first motion being a first disabling motion, and a second partial area motion recognition mode in which the partial area motion recognition mode is maintained in response to the first motion being a second disabling motion;
    recognizing the first motion in the active area;

entering a second partial area motion recognition mode in which the partial area motion recognition mode is maintained in response to the first motion being the second disabling motion; and recognizing a second motion in the active area which is in the second partial area motion recognition mode.

18. A method for recognizing a motion with a display apparatus, the method comprising:

changing the display apparatus from an overall area motion recognition mode to a partial area motion recognition mode; and recognizing the motion that is externally input only in an active area in the partial area motion recognition mode, the motion being provided away from a screen of the display apparatus, wherein the active area is an area where the display apparatus in a fixed state recognizes the motion of a user and is changeable to a plurality of different forms by an input from the user.

19. The method of claim 18, wherein the active area is set by the user.

20. A display apparatus comprising:

a display configured to display multimedia content;

a camera configured to capture an external motion being provided away from the display; and a controller configured to control the display and the camera, wherein the controller is further configured to change a partial area motion recognition mode to an overall area motion recognition mode in response to the captured external motion being input in an active area through the camera matching a disabling motion configured to disable the partial area motion recognition mode, and wherein the active area is an area where the display apparatus in a fixed state recognizes the external motion of a user and is changeable to a plurality of different forms by an input from the user.

21. The display apparatus of claim 20, further comprising:

a panel key;

a microphone configured to receive a sound; and a signal receiver configured to receive a signal from a remote controller, wherein the controller is configured to change the overall area motion recognition mode to the partial area motion recognition mode based on a user manipulation which is input through one of the camera, the panel key, the microphone, and the signal receiver.

22. The display apparatus of claim 21, wherein the active area is a relative area that is displayed on the display in response to recognition of a disabling motion input through the camera.

23. A display apparatus comprising:

a display configured to display multimedia content;

a camera configured to receive an external motion being provided away from the display; and a controller configured to control the display and the camera, wherein the controller is further configured to recognize a user motion being provided away from the display that is received only in an active area using the camera when the display apparatus is in a partial area motion recognition mode, and display a user motion recognition result corresponding to the recognized user motion on the display, and wherein the active area is an area where the display apparatus in a fixed state recognizes the external motion of a user and is changeable to a plurality of different forms by an input from the user.

24. A display apparatus comprising:

an image sensor including a viewing frustum and configured to receive a gesture only from within a sub-portion of the viewing frustum in a partial recognition mode, and configured to receive the gesture anywhere in the viewing frustum in an overall recognition mode; and a screen that corresponds to the viewing frustum and is configured to display content, wherein the sub-portion of the viewing frustum corresponds to an active area on a corresponding portion of the screen, wherein the gesture is provided away from the screen corresponding to the viewing frustum, and wherein the active area is an area where the display apparatus in a fixed state recognizes the gesture of a user and is changeable to a plurality of different forms by an input from the user.

25. The display apparatus of claim 24, wherein the display apparatus is configured to transition from the overall recognition mode to the partial recognition mode when a triggering input is received that is one of at least a gesture, a voice command, and a signal from a remote controller.

26. The display apparatus of claim 24, wherein the display apparatus is configured to transition from the partial recognition mode to the overall recognition mode when a triggering input is received within the sub-portion that is one of at least a gesture, a voice command, and a signal from a remote controller.

27. The display apparatus of claim 26, wherein the display apparatus displays the triggering input in the corresponding active area on the screen.

28. The display apparatus of claim 24, wherein the sub-portion and corresponding active are may be defined by a user by at least one of a template, a gesture drawn area, and a preset selection.

29. The display apparatus of claim 24, wherein the sub-portion and corresponding active are may be defined by a plurality of areas wherein the areas do not touch one another.

30. The display apparatus of claim 24, wherein the correspondence between the active area and the corresponding sub-portion of the screen is defined by having similar location.

31. A display apparatus comprising:

an image sensor including a field of view and configured to receive a gesture only from within a sub-portion of the field of view in a partial recognition mode, and configured to receive the gesture anywhere in the field of view in an overall recognition mode; and a screen that corresponds to the field of view and is configured to display content, wherein the sub-portion of the field of view corresponds to an active area on a corresponding portion of the screen, wherein the gesture provided away from the screen corresponding to the viewing frustum, and wherein the active area is an area where the display apparatus in a fixed state recognizes the gesture of a user and is changeable to a plurality of different forms by an input from the user.

\* \* \* \* \*